United States Patent [19]
Lasche

[11] Patent Number: 4,735,762
[45] Date of Patent: Apr. 5, 1988

[54] LASER OR CHARGED-PARTICLE-BEAM FUSION REACTOR WITH DIRECT ELECTRIC GENERATION BY MAGNETIC FLUX COMPRESSION

[75] Inventor: George P. Lasche, Arlington, Va.

[73] Assignee: The United States of America as represented by the United States Department of Energy, Washington, D.C.

[21] Appl. No.: 16,903

[22] Filed: Feb. 20, 1987

Related U.S. Application Data

[63] Continuation-in-part of Ser. No. 537,218, Sep. 29, 1983, abandoned.

[51] Int. Cl.⁴ .............................................. G21B 1/00
[52] U.S. Cl. ................... 376/102; 376/101; 376/146; 376/147; 376/152
[58] Field of Search ........................ 376/146, 101–106, 376/152, 147, 125, 914, 151

[56] References Cited

U.S. PATENT DOCUMENTS

| | | | |
|---|---|---|---|
| 3,921,405 | 11/1975 | Rosciszewski | 376/146 |
| 4,121,971 | 10/1978 | Marwick | 376/146 |
| 4,290,848 | 9/1981 | Sudan | 376/125 |
| 4,344,913 | 8/1982 | Marwick | 376/102 |

OTHER PUBLICATIONS

*Exploding Reactors for Power*, Marwick, 1973, pp. 7, 9–12, 17–27, 30, 32, 34, 38 CONF-740402-P2, 4/74, Burke et al., pp. 53–62.
Scientific American, Jun. 1971, vol. 224, No. 6, Lubin et al., pp. 21–33.
Nuclear Technology/Fusion, vol. 3, 5/83, Meier, pp. 385–391.

*Primary Examiner*—Harvey E. Behrend
*Attorney, Agent, or Firm*—L. E. Carnahan; Henry P. Sartorio; Judson R. Hightower

[57] ABSTRACT

A high-power-density laser or charged-particle-beam fusion reactor system maximizes the directed kinetic energy imparted to a large mass of liquid lithium by a centrally located fusion target. A fusion target is embedded in a large mass of lithium, of sufficient radius to act as a tritium breeding blanket, and provided with ports for the access of beam energy to implode the target. The directed kinetic energy is converted directly to electricity with high efficiency by work done against a pulsed magnetic field applied exterior to the lithium. Because the system maximizes the blanket thickness per unit volume of lithium, neutron-induced radioactivities in the reaction chamber wall are several orders of magnitude less than is typical of other fusion reactor systems.

10 Claims, 23 Drawing Sheets

LASER OR CHARGED-PARTICLE-BEAM FUSION REACTOR WITH DIRECT ELECTRIC GENERATION BY MAGNETIC FLUX COMPRESSION

BACKGROUND OF THE INVENTION

The U.S. Government has righgts in this invention pursuant to Contract No. W-7405-ENG-48 between the U.S. Department of Energy and the University of California, for the operation of Lawrence Livermore National Laboratory.

RELATED APPLICATION

This application is a continuation-in-part of U.S. application Ser. No. 537,218 filed Sept. 29, 1983, now abandoned.

The invention relates generally to fusion reactors and, more particularly, to blanket designs for first wall protection and energy recovery in inertial confinement fusio (ICF) reactors.

Others have pointed out that it is possible to directly convert some of the energy in an ICF fusion plasma to electricity by allowing it to expand and do work against magnetic fields.

F. Winterberg, "Production of Dense Thermonuclear Plasmas by Intense Relativistic Electron Beams," *Fisica Delle Alte Densita Di Energia*, Academic Press (1971), suggested that since the charged particle products of a fusion fireball would have high electrical conductivity, it could displace magnetic field energy as it expanded, and that this displaced energy could be directly converted to electricity. However, because of the small fireball radius of a typical ICF target, the majority of the fusion yield, lost with escape neutrons, would not be availaole for direct conversion. The conversion efficiency could be degraded by flute instabilities and by radiative losses from the fireball. No allowance was made for impulsive wall loading, nor was his system capable of converting neutron or x-ray energy directly to electricity.

R. J. Burke and J. C. Cutting, "Direct Conversion of Neutron Energy and Other Advantages of a Large Yield per Pulse, Inertial-Confinement Fusion Reactor, "*Proc. 1st ANS Top. Mtg. Tech. of Controlled Nuclear Fusion*, San Diego, Calif., Apr. (1974), proposed that an ICF fusion target be located at the center of a large solid lithium sphere—typically 60 cm in radius–which would be entirely brought to the plasma state by a yield of 80000 MJ or more. Some of the fusion yield could be converted to electricity by work done by the expanding gas on superconducting magnetic fields and the blast would be contained with a chamber 12 meters in radius, by filling the chamber with a liquid spray. Flute instabilities were ignored.

L. Wood and T. Weaver, "Some Direct Conversion Possibilities for Advanced CTR Systems," UCID-16229, Lawrence Livermore National Laboratory, March 16, 1973, suggest a scheme in which a separate Faraday induction pickup coil may directly excite a transmission line after magnetic flux lines are forced across it from the expansion of an ICF plasma.

A. Haught, D. Polk, and W. Fadar, "Magnetic Field Confinement of Laser Irradiated Solid Particle Plasmas, "*Phys. Fluids* 13, 2842 (November 1970), performed experimental work in confining a laser-irradiated target in a minimum-B magnetic field, coupled with theoretical and numerical calculations and an estimate of the fraction of plasma energy converted to compressed magnetic field energy.

S. L. Thomson, "Motivation for Studying Electromagnetic Effects in HYLIFE," Bechtel National, Inc., interoffice Memorandum, May 18, 1979, suggested that the outward-directed impulse of the liquid metal wall in the HYLIFE reactor be softened by trapping axial magnetic flux between radial electrodes protruding from the chamber wall. Althougn it would be possible to directly generate electricity in this fashion, this was not pursued since only a few percent of the yield is converted to kinetic energy in the liquid metal of the HYLIFE reactor. Fluid instabilities were not considered.

Bohachevsky, J. Goldstein, and D. Dickman, "Plasma Behavior in Magnetically Protected inertial Confinement Fusion Reactor Cavities," *Nuclear Technology/Fusion* 1 390 (July 1981), investigated protecting ICF reactor cavities from deoris ion expansion with axial magnetic fields. In their 2D numerical model, flute instabilities cannot appear because of the assumed axial symmetry; they maintain that the instability doubling times are small compared to the cavity clearance times. They point out that some of the ion energy may be directly recovered as electricity with MHD converters located at the ends of the cylindrical cavity. This scheme still requires a separate blanket to convert the neutron energy, as do all others except that of Burke and Cutting. Finally, it fails to address the critical x-ray absorption problem.

R. Tsuji and S. Ido, "Inner Frozen Metal Blanket Concept for an ICF Reactor," *ILE* 8216P, Institute of Laser Engineering, Osaka University (Nov. 4, 1982), suggested a scheme in which an ICF target is surrounded by a solid lithium shell, several centimeters thick, in order to protect the cavity walls from x-ray erosion. In their scheme, the walls would be protected from damage by plasma and lithium debris by cusp magnetic fields. Their scheme did not call for direct electric generation by flux compression, but they did propose to convert the energy of the plasma and debris to electricity in direct converters; most of the neutron energy would be converted to neat in a conventional blanket. Although the shell would expand a distance of 18 cm to a final thickness of 1.7 cm, shell break-up (which would interrupt the induced currents which cause the retarding jxB force) by fluid instability was not addressed. Their model did not account for shock effects due to the pressure rise in the lithium shell due to isochoric neating. Despite an initial magnetic Reynolds number of 9, their equation of motion for the lithium assumed that the magnetic field lines remain stationary with respect to the motion of the lithium.

Very little appears in the prior art in the area of Rayleigh-Taylor instability on the outer surface of a conductor imploded or decelerated by magnetic fields. In the LINUS studies, A. E. Robson, "A Simple Model of a LINUS Fusion System with a Thick, Compressible, Resistive Liner," NRL Memorandum Report 3472, April 1977, instability is to be controlled on the inner surface of a magnetically driven cylindrical liquid metal liner by rotation. This provides a stabilizing outward acceleration for the inner surface (in the direction from the metal to the plasma) but will enhance instability growth on the surface where the rotational acceleration is in the direction of the density gradient (in the direction from the magnetic field to the metal).

In the area of MHD direct-electric generation from ICF fusion plasmas, E. P. Veliknov, V. S. Golubev, and V. V. Cnernukna, "MHD Conversion to Energy from Pulsed Thermonuclear Reactors," from *Atomnaya Energiya*, Vol. 36, No. 4, pp. 258–260, April 1974, have shown that it appears quite feasible to build an MHD generator for evaporating blanket systems with a mean power of 10 GW, an interaction length of 2 meters, a magnetic field of 1.2 T, a maximum voltage of 8.5 kV, and a conversion efficiency of 57%.

Baum at Artec Associates in Hayward, Calif., has successfully performed experimental MHD conversion of pulsed plasmas with megabar pressures and powers in the gigawatt range. With multiple electrodes and expanding chambers, efficiencies in excess of 60% are predicted even for very large magnetic Reynolds numbers.

Whether the fusion plasma is inertially or magnetically confined, most fusion reactor systems have relatively large blanket geometries and convert fusion energy to electricity primarily by means of less efficient thermal cycles. Although electrostatic direct conversion schemes are commonly considered for magnetic fusion reactors, they are generally useful only to recover energy losses from unconfined ions or from unneutralized energetic ions in neutral beam generators. These schemes cannot be used for directly converting the major fraction of deuterium-tritium fusion energy, which is found in the neutrons.

Accordingly it is an object of the invention to provide reactors which can even convert some of the neutron and x-ray energy directly to electricity, as well as ion energy.

The plasmas in magnetically-confined fusion reactors are in pressure equilibrium, because they must be confined for long times compared to acoustic transit times. Therefore, at fusion temperatures, the plasma must be of sufficiently low density that the Lorentz-force stresses do not exceed the strength of materials. This means low power density and large burn volumes for economic total power production. In order to surround this volume with several mean free paths of lithium, great volumes of lithium are required.

It is another object of the invention to provide reactors which require from one to two orders of magnitude less blanket volume than conventional systems.

Most mainline systems (except for liquid-metal-wall ICF reactors, such as HYLIFE) have steel first walls, which are necessary to maintain a good quality vacuum and to endure the intense x-ray and neutron radiation. The first walls of all such reactors will be highly radioactive (2 to 5 billion curies). In addition, these first walls will require replacement every few years because of neutron-induced damage, either from helium embrittlement or from atomic displacements. Because both neutron energy and neutron population are reduced in the steel first walls of these reactors, neutron multipliers (such as lead or beryllium) or isotopic enrichment of $^6$Li are usually required to achieve acceptable tritium breeding ratios.

It is a further object of the invention to provide reactors which require no lithium enrichment, no neutron multiplication, no first wall replacement, and can reduce the neutron-induced radioactivity by more than four orders of magnitude compared to the radioactivity of typical fusion reactors.

It is an additional object of the invention to accommodate large ICF yields. The only other mainline high-yield ICF reactor proposal is HYLIFE. Others are limited to lower yields by blast-wave constraints or by x-ray erosion of the chamber wall With high fusion yields, operation at much higher target gains is allowed, leading to lower recirculating power fraction and higher net plant efficiency.

SUMMARY OF THE INVENTION

The invention is a laser or particle-beam-driven fusion reactor system which takes maximum advantage of both the very short pulsed nature of the energy release of inertial confinement fusion (ICF) and the very small volumes within which the thermonuclear burn takes place. The pulsed nature of ICF permits dynamic direct energy conversion schemes such as magnetohydrodynamic (MHD) generation and magnetic flux compression; the small volumes permit very compact blanket geometries. By fully exploiting these characteristics of ICF, it is possible to design a fusion reactor with exceptionally hign power density, high net electric efficiency, and low neutron-induced radioactivity.

The invention includes a compact blanket design and method and apparatus for obtaining energy utilizing the compact blanket. A fusion target is located at the center of a large mass of liquid lithium or "compact blanket", typically spherical in shape, of sufficient dimensions for neutron energy absorption and tritium breeding. With this configuration, the outward shock-induced kinetic energy imparted to the liquid lithium by absorption of substantially all the fusion energy produced by imploding the target, is maximized while the lithium remains substantially liquid.

The invention maximizes the shock-induced velocity in liquid lithium with an ICF yield, and converts the resulting kinetic energy directly to electricity by doing work against magnetic fields. Burke and Cutting also proposed to absorb most of the fusion yield—including the neutron energy—in a lithium sphere contiguously surrounding the ICF plasma and to convert most of the energy to electricity by work done on magnetic fields. Their scheme differs however, in that the lithium is initially solid, is entirely brought to the plasma state with an extremely larger fusion yield, and is contained by a much larger containment vessel. They rely on gas-pressure expansion, not shock-induced momentum to drive any magnetic flux conversion apparatus. They require incredibly large yields for change-of-state from solid to plasma of the entire blanket, must waste neat energy in the low-temperature phase change to solid lithium for subsequent blankets, and encounter a great deal of energy loss by x-radiation from the plasma to the cavity walls (with consequent loss of efficiency and wall-erosion problems). Further, they are limited in blanket size by the change-of-state requirement, resulting in the inefficient loss of a great deal of neutron energy and causing the cavity wall to become highly radioactive from neutron-induced reactions.

The inertial-confinement fusion reactor according to the invention utilizes a fundamentally different approach to blanket geometry and energy conversion, which makes possible a unique combination of high efficiency, high power density, and low radioactivity. By turning the conventional blanket "inside out" (i.e., the containment system is outside the lithium moderator), by choosing a blanket geometry that produces the maximum shock-induced kinetic energy in liquid metal and the maximum neutron absorption per unit mass, and by providing a non-superconducting magnetic "cushion" around the compact blanket, it is possible to convert even some of the neutron and x-ray energy directly to electricity, as well as ion energy, contain the fusion power in chambers of much smaller volume than required of other fusion reactor systems, contain very large fusion yields, and limit the neutron-induced radioactivity to many orders of magnitude less than is typical of most fusion reactor schemes.

In the following discussion after a detailed analysis of the way in which the fusion energy in all forms is deposited in a compact blanket, the resulting hydrodynamic response is determined. Considerations for fluid stability determine the chamber size, supply voltages, and energy storage capacity of the fusion reactor system. It is shown that the chamber can be constructed of ordinary materials which can withstand the required impulse. The very low neutron-induced radioactivity in the chamber walls, and the net high electric efficiency characteristic of compact blanket reactors are then calculated.

Operation at different combinations of operational parameters determine a wide range of reactor characteristics. There are four parameters which affect the size, cost, radioactivity, and efficiency of compact blanket reactors—the fusion yield, the lithium sphere radius, the magnitude of the applied magnetic field, and the initial perturbation on the lithium surface.

The smoothness requirement on the lithium surface to overcome instability is reasonable (6 to 40 cm initial perturbations are acceptable).

The supply voltages to obtain the necessary magnetic field rise times are available (on the order of 100 kV).

The energy storage requirements are large but equipment costs are reasonaole (12.3 to 148 M$ for the minimum storage capacity including power conditioning and switching systems) compared to typical equipment costs of commercial electric power plants (about 900 M$).

The impulse from the energetic liquid metal can be contained with chambers made of ordinary fiberglass of reasonable thickness (5 to 14 cm) and of reasonable cost (30 to 550 k$ for the fiberglass alone).

The induced radioactivity can be made very low compared to that of typical non-liquid-metal-wall fusion reactor systems (about 12.5 MCi for 1 m spheres to 96.0 kCi for 3 m spheres compared to 911 MCi for typical magnetic fusion reactors). Even if the radioactivity is calculated using the same wall thickness and wall material as a typical magnetic fusion reactor for comparison, the resulting totals for radioactivity are more than 4 orders of magnitude less.

The net electric efficiency of the plant can be very high, e.g., 42 to 55% which is about 50% more than is typical of other fusion (and fission) reactors, permitting the cost of the compact blanket reactor to be about 50% more and yet remain economically competitive.

The compact blanket reactor system, because of its very different approach to energy confinement and energy conversion, takes the greatest possible advantage of the pulsed nature of inertial confinement fusion to produce a combination of high net electric plant efficiency, extremely low induced radioactivity, and high power density not found in any other DT fusion reactor system.

DESCRIPTION OF THE PREFERRED EMBODIMENTS

Figure 1:
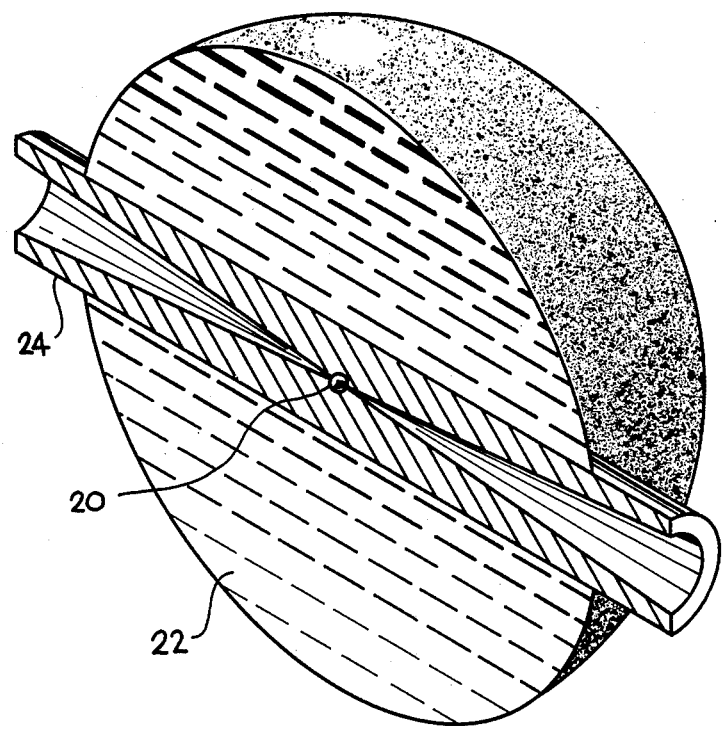
FIG. 1 is a cross-sectional view of a liquid lithium compact blanket.

As shown in FIG. 1, an inertial-confinement fusion target 20 is located at the center of a large spherical mass of liquid lithium, or "compact blanket", 22 of sufficient dimensions for neutron energy absorption and tritium breeding. The target 20 is mounted in a solid lithium beam tube 24 which is inserted through the liquid lithium sphere 22. In an ICF reactor, the target 20 is imploded by directing a laser or charged particle beam into beam tube 24 from each direction. The implosion of target 20 produces fusion energy which is captured in blanket 22. The target is typically filled with deuterium-tritium (DT) fuel for which liquid lithium is the preferred blanket material. The target is radiated from two sides through the beam tube 24 which subtends only a small solid angle allowing beam entry.

With this configuration, the outward-directed shock-induced kinetic energy imparted to the liquid lithium is maximized. This kinetic energy can be converted directly to electricity with very high efficiency by work done against an applied pulsed magnetic field.

The kinetic energy in the liquid lithium originates from high internal pressures caused by the deposition of neutron and x-ray energy in the lithium, as well as from the work done by the expansion of both the post-fusion plasm and the central portion of lithium which has been heated to the gaseous state. Therefore, the neutron and x-ray energy, as well as the ion energy take part in the direct generation of electricity.

Figure 2:
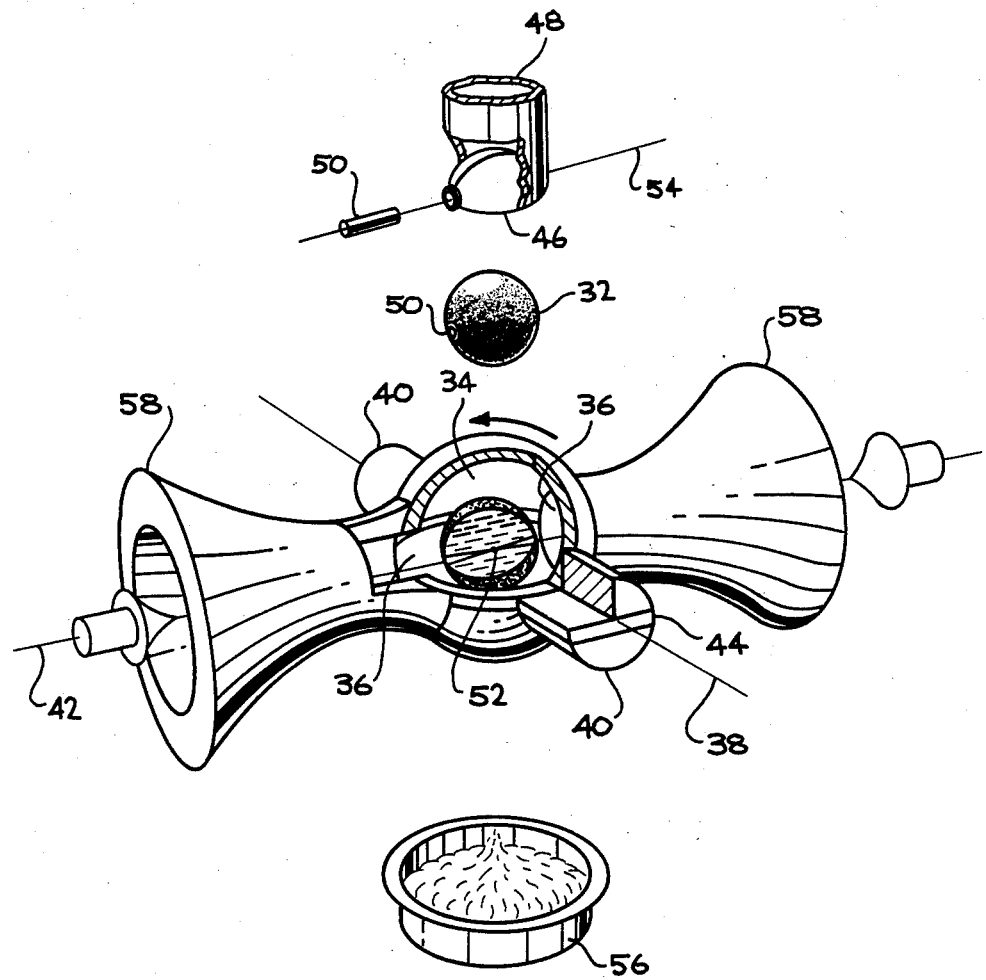
FIG. 2 is a perspective view, partly in section, of a rotating monolithic conducting chamber reactor.

One preferred embodiment of the invention uses a rotating monolithic conducting chamber, shown in FIG. 2. The liquid lithium is configured into a sphere 32, typically one to three meters in radius. A spherical chamber 34 with two large holes 36 rotates at constant angular velocity about the axis 38 of the two cylindrical armatures 40 to allow a new compact blanket, sphere 32, to enter and be captured every half rotation. The holes 36 are aligned vertically when the sphere 32 falls into chamber 34; the holes 36 are rotated 90° to horizontal alignment for the laser beam 42 to enter the chamber. The lasers (not shown) are fired one-quarter rotation later (in the position shown) providing laser beam 42. The chamber acts as two half-turn electromagnets, separated by a continuous insulation break 44 and driven by current supplied to the armatures 40. Helium gas is circulated through the armatures and the conductors in the chamber wall for cooling.

The sphere is formed and dropped from above the chamber by a mechanical apparatus 46. The apparatus 46 operates in a manner similar to an ice cream scoop—two quarter-spheres rotate quickly up into a column of liquid lithium in holding tank 48 forming a sphere 32. Alternatively, two hemispheres may be filled with liquid lithium and then pulled apart quickly. During formation of the liquid sphere in either method, gravitational deformities can be avoided by allowing the entire apparatus to be in free fall for the short time required to release the sphere.

Just prior to the formation and release of the sphere 32, a tube 50 made of solid lithium, with a fusion target 52 at its center, is inserted along the axis of rotation 54 of the sphere-forming apparatus. The tube 50 provides the compact blanket 32 with access for energy beam 42 from two sides to the fusion target 52. A removaole bullet-shaped cap (not shown) prevents liquid lithium from entering the tube 50 as it is inserted into the liquid lithium. The tube 50 typically extends just beyond the surface of the sphere 32. The tubes 50 are made from the lithium which has been diverted for impurity removal and tritium harvesting, and are assembled from two similar pieces to sandwich the target assembly at their midplanes. The tubes 50 subtend only a small solid angle, typically aoout ¼%. The diameter of target 52 is all compared to the diameter of sphere 32. The targets are typically single or multilayered shells of glass, organic polymers, metals or other materials containing fusion fuel, e.g., DT and possibly other materials, as is known in the art. The sizes range typically from 100 microns to several millimeters and possibly larger.

The compact blankets keep their original alignment as they fall because they are so massive and because significant torque cannot be applied to the liquid spheres as they are released. Thus, the beam tube 50 remains in the proper alignment for the laser beam 42. If compact blankets do fall with som "wobble", then the solid angle of the tubes could be increased to compensate for it.

If the fusion targets are cryogenic, the tube could be provided with a hydrocarbon foam insulation to protect the target. If necessary, this foam could function as a liquid helium dewar as well.

Since the liquid sphere is in free fall in vacuum, there are no forces to deform its spherical shape. As it reaches the center of the chamber 34, the magnetic field is pulsed in a time scale for which the sphere is effectively motionless. (For example, if the sphere has fallen 5 meters, its velocity is 10 m/s. If the field rise time is 1 ms, then the sphere moves only 1 cm in this time—negligible compared to its diameter of several meters.) To further reduce the possibility of deformity of the sphere, the sphere forming apparatus 46 can also cool the lithium to form a frozen outer layer before the sphere is released.

Sensing loops confirm the presence of a satisfactory magnetic field and the sphere is checked for unacceptable surface irregularities with microwave sensors. With positive results from these safety checks, lasers or alternatively charged-particle beams are fired to irradiate the ICF target located at the center of the sphere. The fusion energy that is deposited within a few centimeters of the target brings the lithium to extracohesive internal energies—it becomes a gas at liquid density. This gas fills the access tube so quickly that the energy loss which occurs from blackbody radiation and free-streaming ions through the access tube is negligible.

The neutron energy is deposited in the lithium in a time that is short compared to a hydrodynamic response time, raising central pressures to over a million atmospheres and launching a strong shock wave. The shock wave efficiently transports energy outward from the center of the compact blanket before any significant fluid motion develops. The energy behind the shock wave is in the form of both kinetic energy with outward-directed velocity and internal energy, or pressure. After the shock wave reaches the surface a pressure relief wave moves back to the center, nearly doubling the outward-directed fluid velocity.

Much like an expanding spherical piston, the energetic liquid lithium does useful work on the magnetic field, inducing a pulse of electric energy that is first stored kinetically, capacitively, or inductively and then released smbothly to the power grid.

Having been brought smbothly to rest by the magnetic field, the liquid lithium flows out as the chamber continues to rotate, e.g., into collector or sump 56. As it is pumped back to be recycled for new compact blankets, some of its neat energy is extracted to produce electricity in steam turbines.

After the liquid lithium is orought to rest by doing work against the magnetic field, it drains to the chamber floor and is pumped through neat exchangers where residual neat is converted to electricity in an ordinary thermal cycle. A fraction of the lithium is then diverted for impurity removal, tritium harvesting, and casting of new laser beam access tubes; the remainder is recycled for subsequent compact blankets. Some of the electric power produced by the plant must be recycled to supply the beam driver, the pulsed magnets, and the plant systems.

Figure 20:
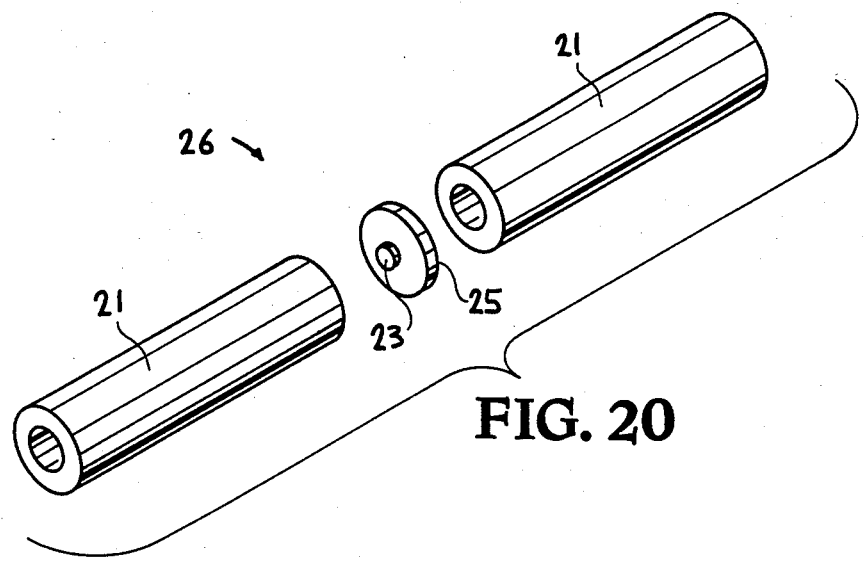
FIG. 20 is an assembly drawing of the beam tube with embedded fusion target.
Figure 21:
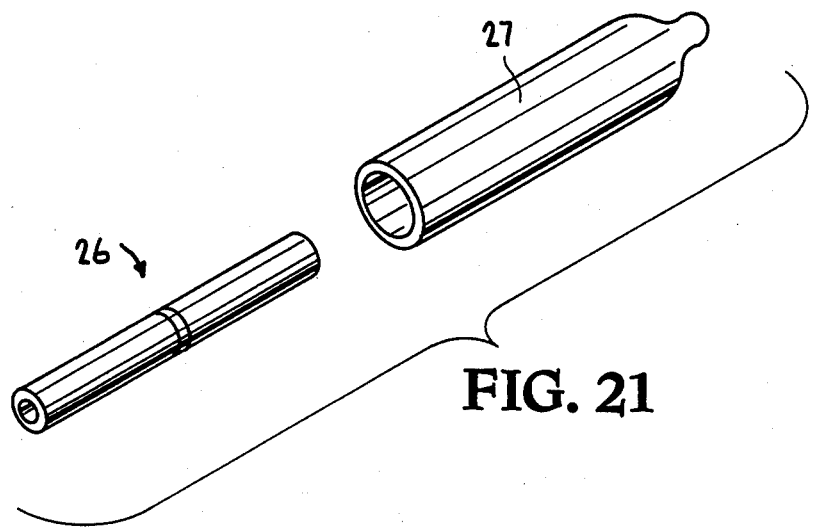
FIG. 21 is an assembly drawing of the beam tube and protective housing.

One manner of forming a beam tube assembly 26 is illustrated in FIG. 20. A pair of beam tube halves 21 are made in an assembly area by extruding, cooling and sawing lithium that has been tapped from the recirculating liquid lithium collected in the sump 56 (FIG. 2) or from some other source of liquid or solid lithium. (Such tapping is also required for the purpose of tritium extraction and impurity removal). A fusion capsule 23 is mounted through the center of a lithium disk 25. The beam tube nalves 21 are assembled and welded by electric current with fusion capsule 23 (mounted to lithium disk 25) sandwiched in place at the center of beam tube assembly 26. The length of the beam tube is chosen so that it exceeds the diameter of the liquid lithium sphere. The thickness of the solid lithium beam tube is chosen so that it will not melt through in the short time (typically less than one second) that it is exposed to the liquid lithium in the sphere forming apparatus. A thickness of one inch should be sufficient; the solid lithium can also be cooled to a temperature sufficiently low that melting when brought into contact with liquid lithium will not be too rapid. Beam tube assembly 26 is then placed inside a tubular protective sleeve or housing 27, as shown in FIG. 21, to await loading into the sphere forming apparatus; housing 27 is typically made of steel or of an insulating material if desired to reduce thermal contact with the liquid lithium.

Figure 22A:
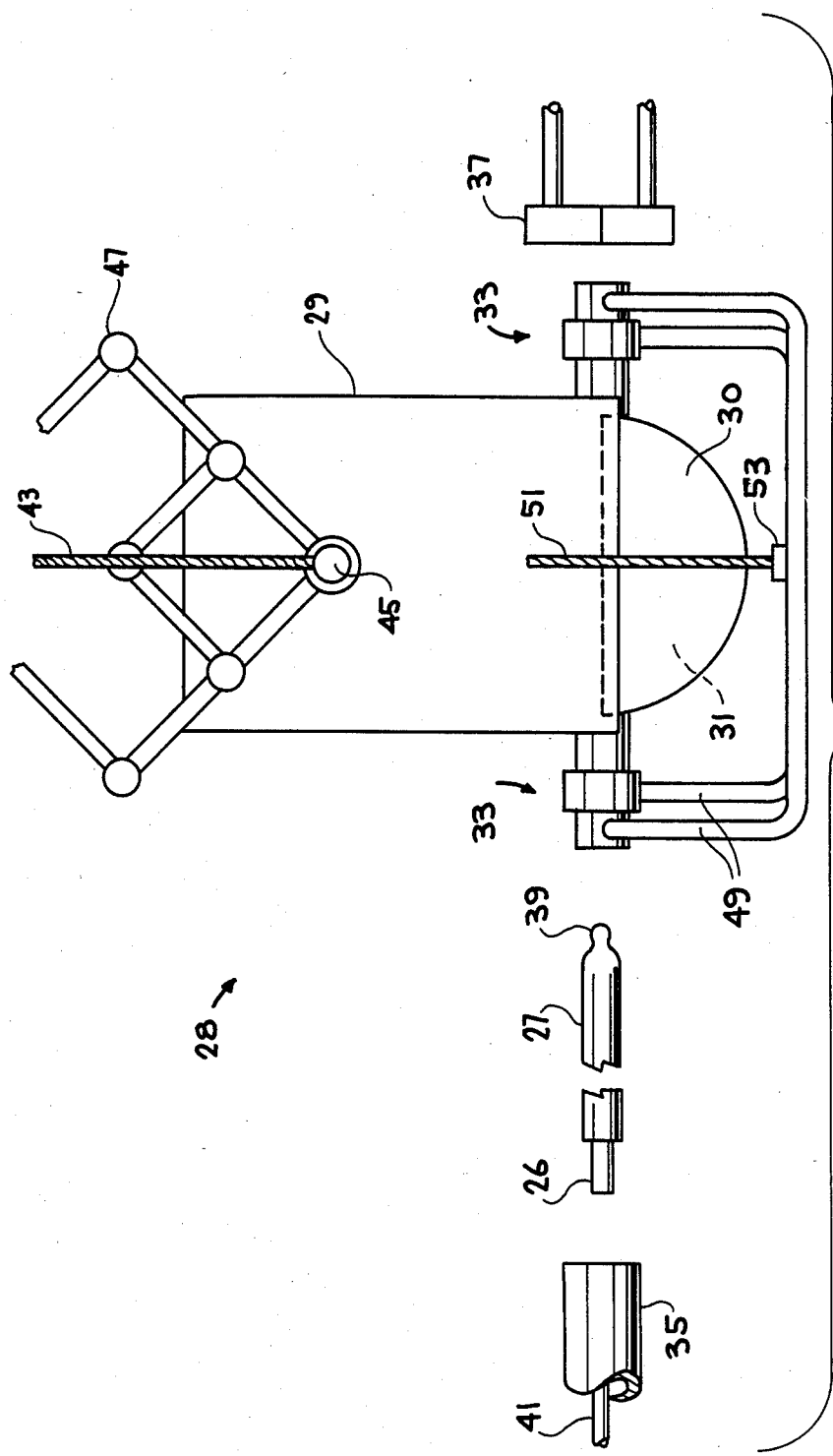
FIGS. 22 A, B, C are perspective views of a sphere forming apparatus with rotating quarterspheres.

One apparatus for forming a liquid lithium sphere with the solid lithium beam tube positioned therein is illustrated in FIGS. 22A, B, C (which provide further detail of the schematic apparatus shown in FIG. 2). Liquid lithium flows into cylindrical tank 29, typically made of steel. The bottom of tank 29 is formed of a pair of steel quarterspherical shells or quarterspheres 30 and 31 in the rotated-down position to form a hemispherical bottom. Thus, the liquid lithium in tank 29 is formed into a hemispherical shape at the bottom of the tank. Quarterspheres 30, 31 are pivotably mounted to the tank 29 by a pair of rotating joints 33 (which are shown in greater detail in FIG. 23). Quarterspheres 30, 31 fit closely together and fit snuggly within the side walls of tank 29 so liquid lithium leakage is minimized; if necessary compliant sealing means could be included at the interfaces as in piston rings in an automobile engine. Similarly rotating joint 33 provides a small opening in the tank (about the diameter of the beam tube) which could be sealed by flaps, compliant sealing material, or a shutter. To prevent leakage if necessary through the openings, the beam tube can be inserted prior to liquid lithium fill particularly with the use of a thermally insulated housing. The nigh viscosity of liquid lithium further minimizes any possibility of leakage (the viscosity of lithium at its melting point is aoout 5 poise, the consistency of soft putty compared to the viscosity of water of 0.01 poise); furthermore, any liquid lithium which leaks from the tank merely falls through the reactor chamber and is collected in the lithium sump at the reactor chamber floor.

At all times the surrounding environment in and around the reactor chamber is under vacuum at the vapor pressure of lithium present in the system (about $10^{-3}$ torr at 500 C.), so no evaporation of lithium take place (it is in state equilibrium).

Beam tube assembly 26 with its protective sleeve or housing 27 is pushed into the sphere-forming apparatus 28 througn one rotating joint 33 by ram mechanism 35. When the protective housing 27 emerges from the opposite end of tank 29 through the second joint 33 a clamping mechanism 37 grabs and holds the nipple 39 on the end of housing 27. Housing 27 thus closes the joints 33 against any further liquid lithium flow from the tank. Housing 27 may be made thin (as in the steel or brass casings of ammunication) minimizing the requirements for sealing means to prevent flow of liquid lithium around the beam tube protrusion once the housing 27 is removed. A retractable expansion clamp 41 extends from ram mechanism 35 into the solid lithium beam tube 26 to hold the beam tube in place and allow clamping mechanism 37 to extract housing 27. Clamping mechanism 37 pulls protective housing 27 out of tank 29 to leave the lithium beam tube in position (held by clamp 41) at any desired time prior to formation and release of the sphere; clamp 41 is then also retracted prior to release of the sphere.

Sphere forming apparatus 28 is suspended from an overhead frame or support (not shown) by means of main suspension cables 43 which are connected to the tank by cable mounts 45. Guiding apparatus 47 which may follow some guides or tracks (not shown) to prevent swinging may also be attached to tank 29. After housing 27 and clamp 41 have been withdrawn from tank 29 sphere forming apparatus 28 is released and allowed to fall freely. During this fall quarterspheres 30, 31 are rotated to the up position by mechanical means connected to tank 29 to form and release a sphere of liquid lithium with a beam tube through its center. The mechanical means for rotating the quarterspheres 30, 31 include a pair of quartersphere rods or handles 49, each connected to one of the quarterspheres through rotating joints 33. The handles 49 are connected at eyes 53 to quartersphere handle cables 51 which are connected to the fixed overhead frame so that as the sphere forming apparatus 28 falls, cables 51 pull up on handles 49 causing the quarterspheres 30, 31 to rotate to the upright position. No lithium leaks out and the liquid lithium sphere does not deform after the apparatus is released because the entire apparatus together with all the liquid lithium in it is in free fall and is not subject to differential pressures caused by gravitational forces (exactly as in the case for liquids in orbit around the earth which although under the constant influence of the earth's gravity are also in free fall). The tank 29 with rotating hemispheres 30, 31 are moving at the same speed as the lithium so there is no relative motion and a perfect sphere can be formed.

Finally the sphere forming apparatus 28 is arrested from its fall by mechanical means such as the suspension cables 43 connected to tank mounts 45 and returned to its former position leaving the liquid lithium sphere free to fall further. Both the main suspension cables 43 and quartersphere handle cables 51 may be connected through shock absorbers to prevent undue stress on the apparatus when it reaches the bottom of its fall. As the liquid lithium separates from the steel it does not stick because the chamber is in vacuum at the vapor pressure of the liquid lithium. This is contrary to the customary phenomenon of a liquid separating from a solid at atmospheric pressure where sticking and deformation occur because the atmospheric pressure squeezes the liquid in from the sides rather than letting vacuum form at the separation surface. Liquid lithium does not boil away in vacuum because the vacuum is at the vapor pressure of liquid lithium (e.g. from the sump) and is, therefore, in state equilibrium. Liquid lithium at the preferred operating temperatures has a very high viscosity, similar to soft putty or wax, and the problems with sphere formation that might occur with a fluid of low viscosity such as water are much abated. Furthermore, perturbations and deformations in the surface of the liquid lithium sphere will not affect the performance of the compact blanket in direct electric generation because the Raleigh-Taylor instability growth times are too long to have detrimental effect, as will be explained in greater detail herein. The compact blanket does not necessarily have to be spherical, but can be ellipsoidal in shape.

One particular design of the quarterspheres 30, 31 and rotating joint 33 is shown in FIGS. 23 A, B, C, D. Quartersphere 30 is connected at each end to a tubular member 55. Tubular member 55 defines an opening 57 which communicates with the interior of quartersphere 30. The outer portion 58 of tubular member 55 contains a plurality of keys 60 projecting from the surface. The inner portion 60 is half open (the cylindrical surface on the hidden side of FIG. 23 A is removed) so that when the quartersphere 30 is rotated to the up position the beam tube will fall free, as will be more apparent with reference to the description of quartersphere 31. Roller bearings 61 are mounted on tubular member 55 between outer portion 58 and inner portion 60, held in place by circular spring clips 62 in grooves on tubular member 55.

Figure 22B:
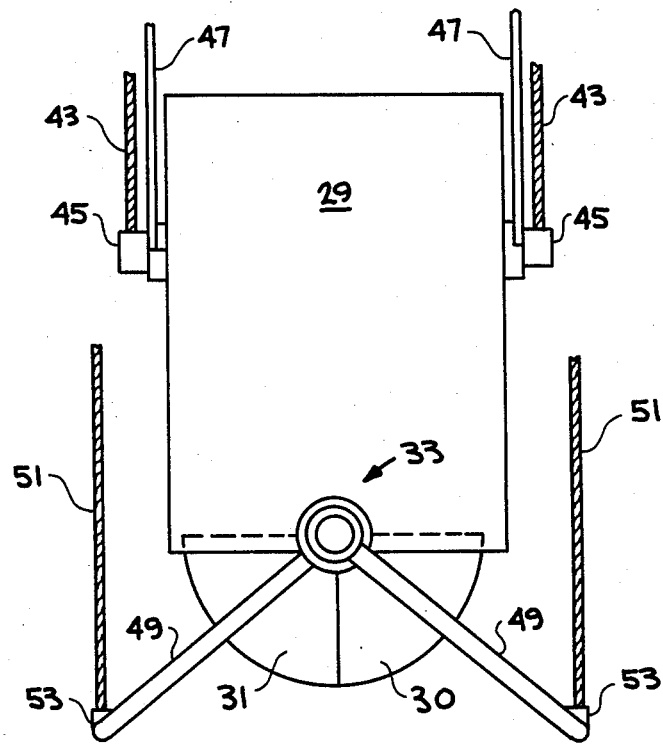
Figure 22C:
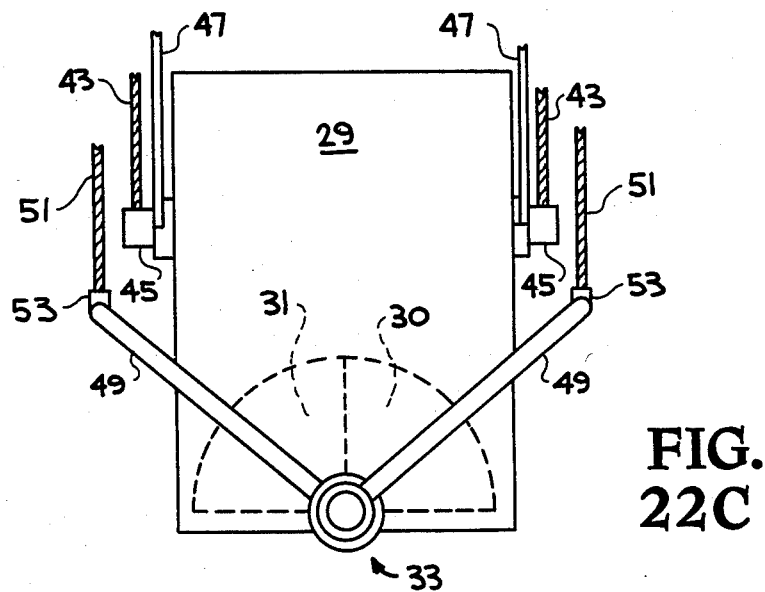
Figure 23A:
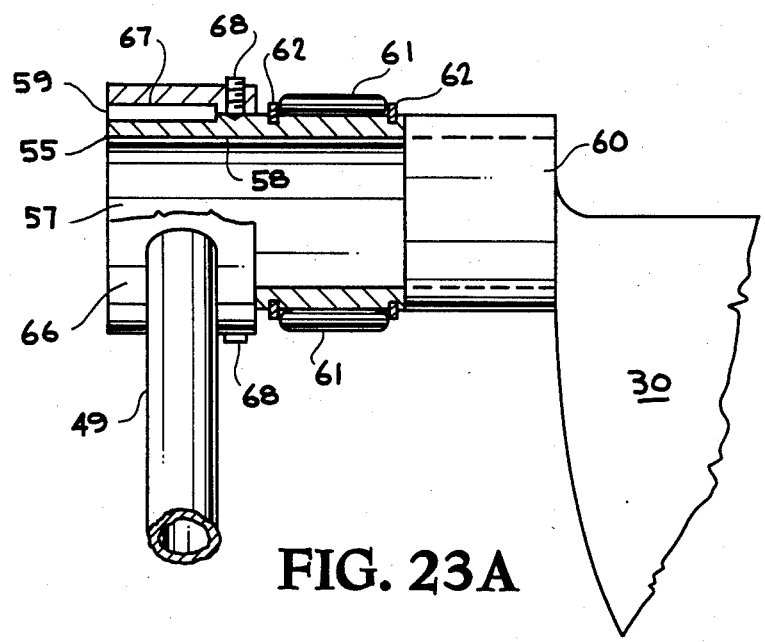
FIGS. 23 A, B, C, D are side and end views of the rotating quarterspheres and rotary joints of FIG. 22.
Figure 23B:
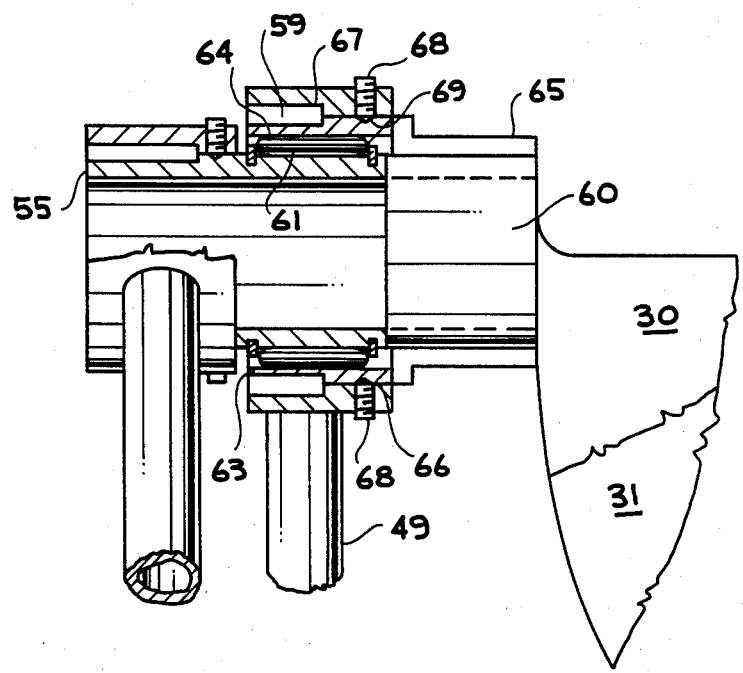
Figure 23C:
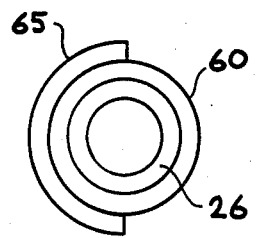
Figure 23D:
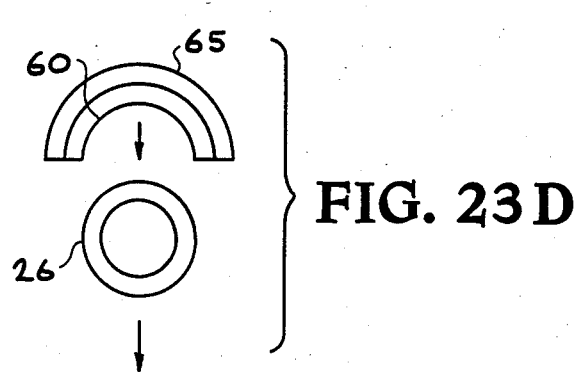

Second quartersphere 31 similarly has a tubular member 63 at each end which is shorter than member 55 and slightly wider in diameter so that it fits over member 55 as shown in FIG. 23B. The outer portion 64 is a complete cylinder and fits over the roller bearings 61 of member 55. The inner portion 65 is again only a half cylinder which complements inner portion 60 to form a closed channel along the axis of the hemisphere when quarterspheres 30, 31 are in the bottom position and allow the beam tube, which extends out from tank 29 into the tubular opening 57 to fall free when the quarterspheres 30, 31 are rotated into the up position, as illustrated in FIGS. 23 C, D respectively. Outer portion 64 contains a plurality of keys 59 projecting therefrom. Handle 49 is connected to ring 66 which has a plurality of slots 67 which match the keys 59 on outer portion 64. Ring 66 slides over outer portion 64 with slots 67 engaging keys 59. A plurality of set screws 68 extend through ring 66 into groove 69 on outer portion 64 to lock handle 49 to quartersphere 31. Similarly a second handle 49 is connected to a ring 66 with slots 67 and set screws 68 for attachment to the outer portion 58 of tubular member 59. With this configuration as the handles 49 are pulled up while tank 29 is falling, the quarterspheres 30, 31 pivot about joints 33 mounted to tank 25 and are rotated up into the interior of tank 29 to form the upper surface of the lithium sphere, as was shown in FIGS. 22B, C. The quarterspheres 30, 31 in the up position separate the sphere from the rest of the tank, and when the motion of the tank is stopped allow the sphere to fall out through the bottom, while also allowing the beam tube which extends into the joints 33 to fall with the sphere. The time for sphere formation is thus very short, determined by the speed at which the tank is falling which is a function of the distance it has fallen before the handles are pulled up. Because of the high viscosity of the liquid lithium this operation can be performed rapidly enough to form a sphere or ellipsoid which meets the process requirements.

As just described, the beam tube and protective housing are inserted into the sphere forming apparatus prior to its being dropped; however, the insertion and removal mechanisms (ram mechanism 35 with clamp 41 and clamp mechanism 37) could also be mounted to the apparatus which is dropped and thus the protective cover can be removed just prior to the formation and release of the sphere. Pneumatically actuated mechanisms can easily operate in a time frame consistent with the falling sphere formation mechanism, i.e., fractions of a second during which time the apparatus will drop typically only a few feet. An alternative to the insertion of the beam tube with the housing 27, if there are significant delays, is to insert the housing 27 alone and then insert the beam tube 26 into the tubular housing 27 just prior to sphere formation and release.

The method and means just described will form and release a liquid lithium sphere with beam tube and fusion capsule towards the target chamber where the capsule is irradiated from two sides through the beam tube. By releasing the sphere at a point close to the reactor chamber, the sphere need only travel a short distance, typically one and a half to two sphere diameters before the sphere reaches the center of the chamber. Thus, there is too little time for the beam tube to melt significantly from contact with liquid lithium. By choosing the temperature and thickness of the beam tube and by making the protective housing of a heat insulating material the beam tube can easily be kept solid until the laser beams are fired.

Figure 24:
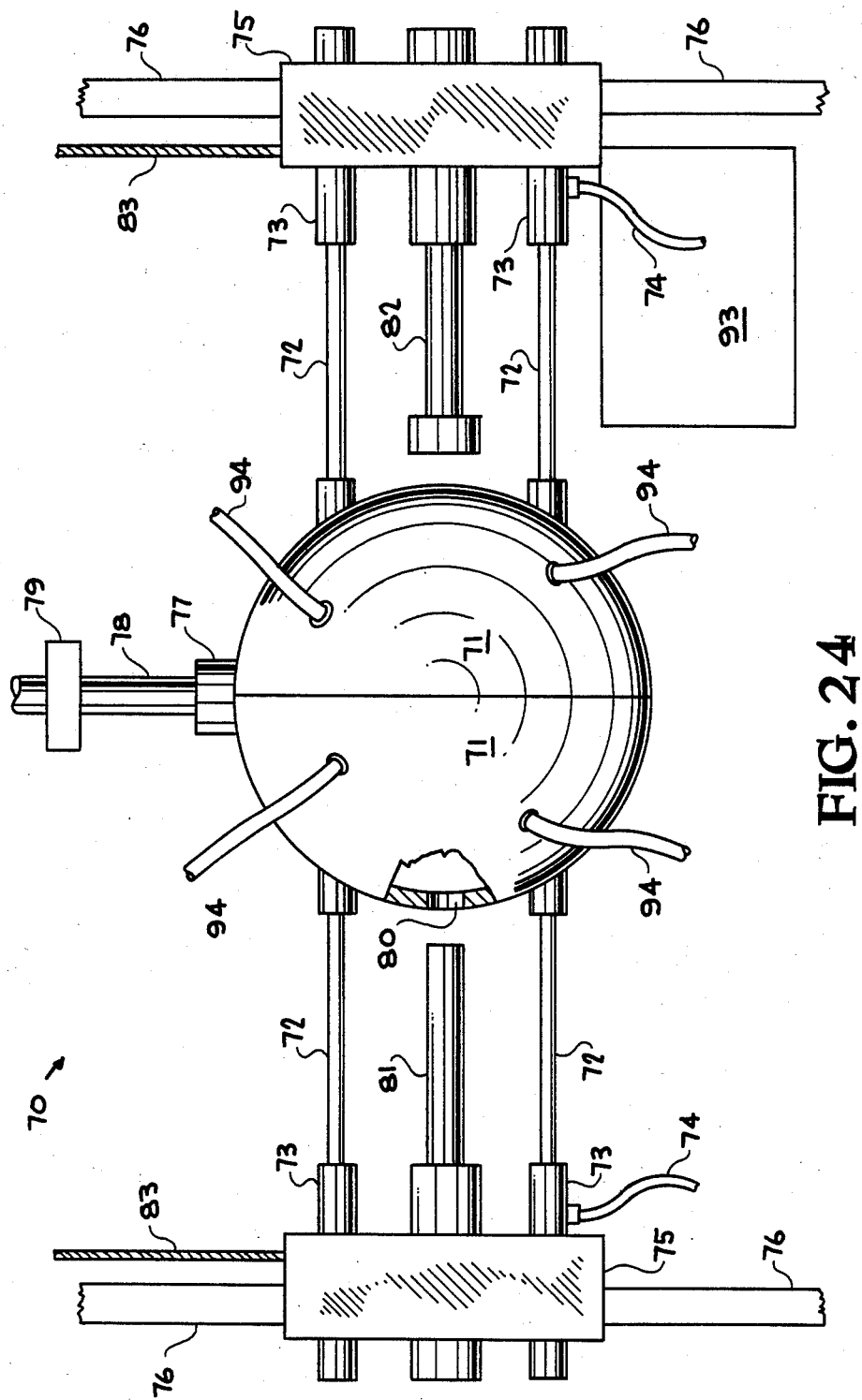
FIG. 24 is a perspective view of a sphere forming apparatus using a spherical mold.

An alternate sphere forming apparatus to the rotating quartersphere or "scooper" embodiment is a spherical mold or a "pull apart hemisphere" embodiment, as illustrated in FIG. 24. A spherical mold apparatus 70 is made of a pair of vertical hemispheres 71 which are held together to form a spherical mold. Each hemisphere 71 is held by at least one pneumatically actuated support rod 72 which telescope from cylinders 73 and are pneumatically actuated by lines 74 so that the hemispheres 71 can be pulled apart to open the mold or pressed together to close the mold. Cylindrical sleeves 73 are mounted on a track assembly 75 which travels on vertical tracks 76. There are two track assemblies 75 and associated tracks 76, one for each hemisphere 71. The spherical mold is filled through fill port 77 by liquid lithium provided through fill pipe 78 and controlled by pneumatic or other valve 79. A window 80 in each of the hemispheres 71 allows for insertion of a beam tube into the sphere of liquid lithium. To prevent leakage of liquid lithium through the windows 80 the beam tube can be inserted prior to lithium fill or, alternatively the windows 80 have some sealing means such as flaps or a shutter to prevent leakage, if the lithium viscosity is insufficient by itself to prevent leakage, or, as a further alternative, the leakage may be permitted until the windows 80 are blocked by the beam tube. As previously described the beam tube is formed of solid lithium enclosed in a protective cover or housing. Alternatively, no protective cover may be necessary but an end cap placed in one end of the tube so that it does not fill with liquid lithium as it is pushed into the sphere. A pneumatically operated beam tube insertion assembly 81 inserts the beam tube and its protective cover through window 80 into the spherical mold; as shown, the beam tube insertion assembly 81 is a pneumatically actuated telescoping rod with a clamp mechanism on the end. A pneumatically actuated withdrawal assembly 82 clamps onto the end of the protective sleeve around the beam tube for withdrawing the sleeve at the appropriate time. The withdrawal assembly 82 may also be a pneumatically actuated telescoping rod with clamping means at the end. The beam tube (and its protective housing) have a greater length than the inside diameter of the mold and extend into the walls of hemispheres 71 or even outside the hemispheres if the walls are relatively thin. The insertion and withdrawal assemblies 81, 82 are also mounted on track assemblies 75. The track assemblies 75 are held by suspension cables 83. The spherical mold apparatus 70 is placed in free fall by releasing track assemblies 75. As the mold assembly 70 is in free fall (while the beam tube is held by insertion assembly 81) withdrawal assembly 82 pulls out the beam tube protective housing, which may be collected in a catcher bin 93 mounted to track assembly 75, and insertion assembly 81 then releases the beam tube. Hemisphere support rods 72 are rapidly retracted into sleeves 73 to pull the hemispheres 71 apart and release a liquid lithium sphere with embedded beam tube. The track assemblies 75 are stopped in their free fall by suspension cables 83 while the sphere is allowed to fall into the reactor chamber.

As a variant to the preferred embodiment of a liquid sphere thus far described, a cooling means may easily be attached to the spherical mold apparatus 70 in order to form a frozen or solid lithium shell on the surface of the liquid lithium sphere. In one embodiment, a coolant may be circulated through channels in the walls of hemispheres 71. Coolant may flow in and out of cooling channels in hemispheres 71 by means of coolant hoses 94 from a coolant system which may be mounted to track assembly 75 or elsewhere. To prevent the beam tube from melting too rapidly in addition to the thickness of the tube and the temperature of the tube, an insulating protective housing can be used to insulate it from the surrounding liquid lithium until the protective housing is withdrawn. Furthermore, a coolant could be flowed through a channel in the protective housing.

Figure 25A:
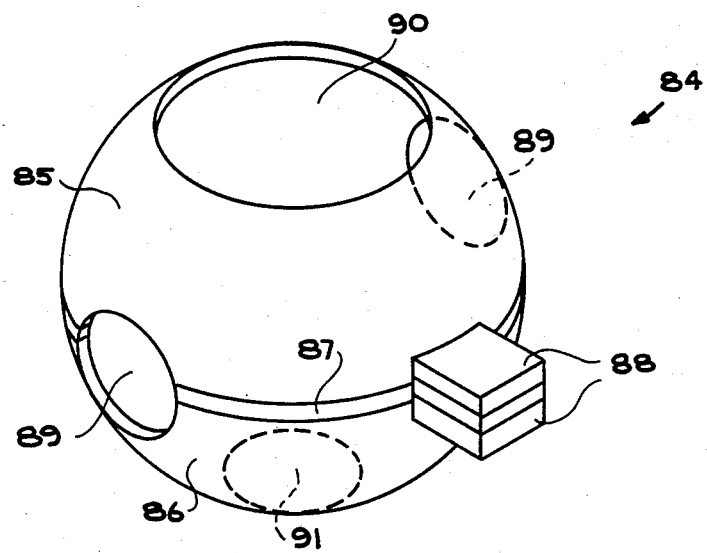
FIGS. 25 A and B are perspective views of a stationary reactor chamber.
Figure 25B:
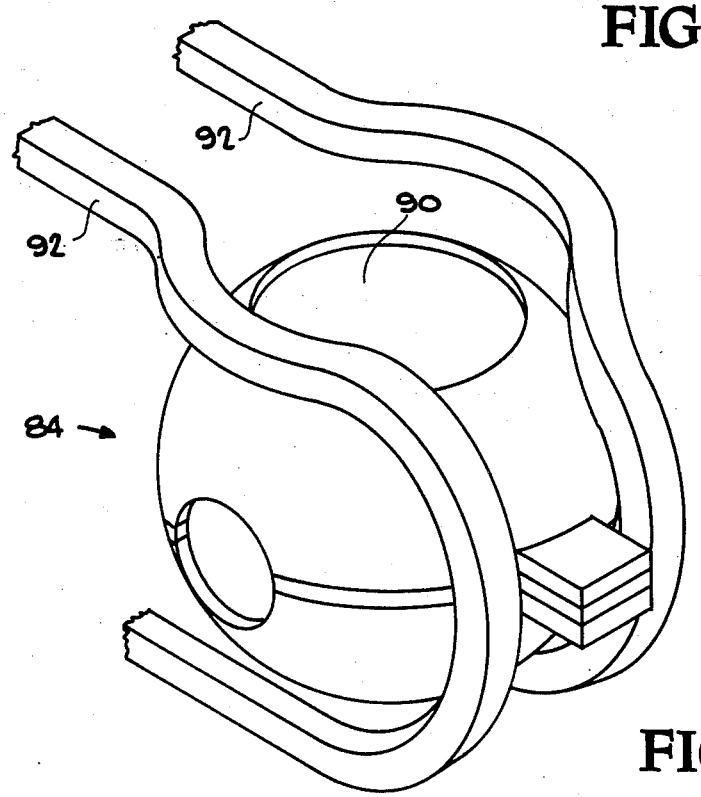

As an alternative to the rotating chamber of FIG. 2, a fixed reactor chamber 84 is illustrated in FIGS. 25A, B. Stationary chamber 84 is typically spherical in geometry and made of upper conducting section 85 and lower conducting section 86 which are separated by a ceramic electric insulator 87. A pair of parallel spaced electrodes 88 project from chamber 84, one from each of sections 85 and 86 and are separated by a corresponding projection of electric insulator 87. Electrodes 88 are used to energize the magnetic field in the chamber by flowing electric current through sections 85 and 86 (which are electrically connected in series, e.g., through a second pair of electrodes 88 on the opposite side of chamber 84) and to extract directly generated electricity when the fusion capsule has been exploded, the fusion energy converted to shock-induced kinetic energy, and the resultant expanding metal sphere used to compress the magnetic field formed in the chamber, thereby inducing electricity in the conducting chamber. Chamber 84 contains a pair of opposed beam ports 89 for firing a laser or particle beam into the chamber when the liquid lithium sphere with embedded fusion capsule reaches the correct position during its fall into the reactor chamber 84. A large entry port 90 is formed in upper portion 85 of reactor chamber 84 to admit the falling lithium sphere. Recovery port 91 is formed in lower chamber section 86 at the bottom of reactor chamber 84 to allow recovery of liquid lithium after the fusion and energy production process. Since in the optimum configuration chamber 84 may only be about 50% larger than the liquid lithium sphere, entry port 90 will be quite large and to a lesser extent recovery port 91 is of significant size. The presence of these fixed entry and recovery ports 90, 91 will produce an aberation to the magnetic field (which is eliminated in the rotating chamber configuration shown in FIG. 2). This aberation in magnetic field can be corrected by the addition of external "oumper" coils 92; such bumper coils are well known in the art of magnetic fusion reactor design, specifically tokamak design. Alternatively, electrically conducting sliding "trap doors" can be moved in and out of place by pneumatic means to provide for entry and recovery points while in the open position and yet prevent aberation to the pulsed magnetic field while in the closed position, i.e., a trap door is closed over port 90 after the sphere has passed through the port while the magnetic field is applied. In place of a conducting chamber which also is used to form the magnetic field, a fiberglass or carbon fiber chamber may be substituted, with an internal sheet of conductor, i.e., coating, which forms a one turn magnet, or other internal (or even external) means for generating a magnetic field in the chamber.

In operation at the moment the liquid lithium sphere has fallen to the center of reactor chamber 84 laser beams are fired through beam ports 89 and along the beam tube of the lithium sphere to produce fusion of the embedded capsule. The fusion energy is converted to the maximum extent theoretically possible to shock induced kinetic energy, as described herein. Power source is applied to electrodes 88 just before the fusion target is imploded; thus there is no magnetic field to affect the lithium sphere during its formation and fall into the chamber. The magnetic field can be applied very quickly with respect to the fall of the lithium sphere. Current flow is in one direction through the chamber 84 when the magnetic field is being formed, out reverses when electric energy is being drawn out of the compressed magnetic field as it slows down the expanding compact blanket.

A liquid lithium blanket with embedded fusion capsule formed and used as described, provides a new way of recovering energy from a fusion process. The blanket and fusion capsule together form a "freestanding" target since they are formed and utilized together as an integral structure. This differs significantly from traditional fusion (and even fission) concepts where a blanket may be used to capture heat or breed radioactive material, out the blanket forms a part of the chamber or reactor and not a part of the target introduced into the reactor as part of the process. According to the principles of the invention the spherical mass of liquid lithium is designed with the appropriate dimensions for neutron energy absorption, tritium breeding, mitigation of neutron induced reactor radioactivity, and efficient conversion of shock induced kinetic energy in the lithium fluid to electric energy by means of magnetic induction. The last two of these effects are the key advantages by which the present concept is uniquely preferable to any prior art methods. Following the principles of the invention, using computations using models of fusion burn and neutron and radiation transport, as well as experimental data, leads to the parameters that the minimum radius for neutron energy absorption is about 0.3 meters; for tritium breeding is about 0.8 meters; for mitigating induced radioactivity by a factor of 100 over typical magnetic fusion reactors is about 1.0 meters and by a factor of 10,000 is about 3.0 meters; and for efficient direct generation of electricity by the expanding liquid metal sphere (limited by strength of materials considerations) is about 1.0 meters for capsules of 300 MJ yield and 3.0 meters for 1200 MJ yields. The radius of liquid lithium spheres actually chosen will therefore depend on engineering economics optimizing the cost of the laser driver, the cost of fusion capsules and the cost of radioactive containment at the time of construction, but will preferably lie in the range from 1.0 to 3.0 meters. Practical apparatus for the formation and utilization of liquid lithium spheres to meet these requirements have been demonstrated above. Lasers and fusion capsules with yields of 300 to 1200 MJ are also presently known. Accordingly all the components are available to carry out this innovative process.

Figure 3:
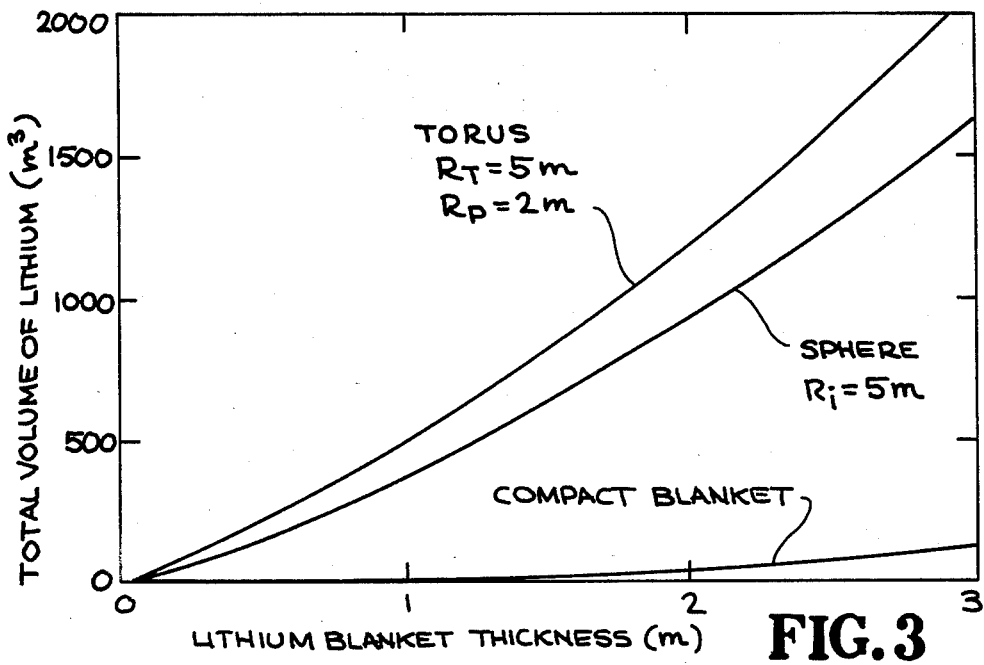
FIG. 3 shows a comparison of lithium inventory required by the compact blanket and conventional reactor designs.

The configuration of the lithium blanket in a sphere contiguously surrounding the ICF fusion plasma offers the maximum possible attenuation of neutrons per unit mass of lithium. The compact blanket approach also minimizes the volume of lithium required for a fusion reactor. FIG. 3 shows a comparison of the volume of lithium required in compact blankets (the actual total volume of lithium in the reactor would have to be increased somewhat for the lithium in the circulation loops) and other conventional fusion reactor designs.

Reduced lithium inventory has the advantage of correspondingly smaller tritium inventory and a smaller possible energy release in the unlikely event of a lithium fire. Thicker blankets have the advantage of much less neutron-induced radioactivity in the chamber wall and longer useful chamber wall life.

For lithium spheres of radii up to three meters, the fusion neutrons will be required to traverse many mean free paths in lithium before encountering other material. This results in many exponential attenuations in both the population and the energy content of the escaping neutron flux. For this reason, the neutron-induced radioactivity in the reaction chamber walls will be extremely low. Because of the very low neutron flux, the effect of "magnetic cushioning", and the absence of x-ray fluence to the chamber wall, low-activating structural materials can be used which will lead to still greater reductions in neutron-induced radioactivity. As a consequence, this invention is probably the only sytem for which hands-on maintenance might be possible.

As with other liquid-metal-wall reactor designs, there is no structural material between the fusion neutron source and the lithium absorbing medium. In targets designed to minimize induced radioactivity, and with ongoing impurity removal from the circulating lithium by low-eutectic condensation, the induced radioactivity of extracted target debris will be undetectable after a few weeks' holding time.

Because lithium is a good conductor of electricity, the magnetic field is excluded from most of the liquid lithium if applied for a short time compared to a magnetic field diffusion time. On this time scale, the lithium does work on the magnetic field in the same way that a piston does work on a gas. Thus, most of the energy in the applied magnetic field may also be directly recovered as electricity.

The magnets need not be superconducting, greatly reducing expense. If the pulsed field is applied for a time that is short compared to the time between pulses, the averaged ohmic power losses are a small fraction of the total plant electric power.

Like a cushion, the magnetic field distributes the impulse to the reaction chamber wall over time. The wall will not be stressed beyond acceptable fatigue life limits if the wall impulse time is sufficiently long.

The applied magnetic field can be maintained at a constant level during the time the lithium is being stopped by decreasing the electric potential across the external energy-storing load at a constant rate. With a constant magnetic field, the lithium suffers a constant deceleration, comes smoothly to rest, and the Lorentz stress on the chamber walls is a constant, acceptable value.

To restrain the lithium with the jxB force, the magnetic field must have components parallel to the lithium surface; for instability considerations, it must be approximately homogeneous. Fortunately, it is possible to produce a magnetic field that is approximately homogeneous and parallel to most of the surface of the compact blanket, except near its axial ends, by proper design of the magnetic field coils.

The outer surface of the liquid metal will develop flute instabilities. Although such instabilities would be catastrophic in a steady state system, in a pulsed system they can be accommodated by choosing a design such that the critical instability growth times are long compared to the time required to stop the motion of the liquid lithium.

Some energy may escape in the two directions parallel to the magnetic field. This axial loss of energy can be minimized by designing the magnetic field so that it is more intense where the lines flux leave the chamber (like a magnetic mirror). However, most of the kinetic energy in the liquid lithium originates from work done by the shock wave and the subsequent pressure relief. Therefore, the majority of the energy is directed radially outward from the ICF source. Most of this energy can be converted directly to electricity by pushing the magnetic lines of flux back across the conductors that originally generated them. With the magnetic field dynamically adjusted so that it plays the role of a "soft cushion", there should be little energy left over for escape from the chamber in the direction of the magnetic fields.

If a significant fraction of the energy does escape along the field axis (which is not expected), external MHD generators 58 in FIG. 2 may be provided to directly convert the kinetic energy of the escaping conducting gases and liquid lithium. In the MHD generators, the conducting fluid encounters a transverse magnetic field, which induces a current transverse to both the field and the fluid motion. This current creates a retarding jxB force which does work on the fluid; the resulting loss of kinetic energy appears as useful electric power and also as resistive heating of the fluid. Alternatively, MHD generators can be used to convert this escape energy to useful heat for thermal conversion if their loads are short-circuited through the lithium in the circulation loops. The flow is retarded either way the MHD generators are used, thus protecting the beam optics from damage by plasma, conducting gases, and kinetic liquid lithium.

Liquid lithium is a very efficient heat transfer agent, is its own coolant, and can be pumped electro- magnetically without wear or corrosion to seals or impellers. It need not be pumped across strong magnetic fields as is necessary in magnetic confinement schemes. Because lithium has about half the density of water, it can be pumped back to the top of the chamber with relatively little electric energy.

Liquid lithium, rather than solid lithium, must be used for most of the compact blankets because heat exchanger outlet temperatures must be well above the melting point of lithium for efficient thermal-to-electric conversion.

Using natural lithium, the tritium breeding ratio is well above unity—no neutron multiplier or lithium isotopic tailoring is needed. No external tritium breeding blanket is required. Because of the low solubility of tritium in liquid lithium, the reactor tritium inventory and the tritium inventory doubling time will also be low, an advantage over solid-breeders for both environmental safety issues and start-up inventory expense.

Tritium can be extracted from liquid lithium easily and efficiently with molten salt techniques. Impurities, such as lead, can be continually removed from liquid lithium by eutectic separation at the one atom-percent level. As liquid lithium cools, the solubility of tritium increases, so that tritium remains trapped in the lithium in the event of operational shutdown.

Except for tritium, there is almost no neutron-induced radioactivity in pure lithium. Because of its very low mass number, it is an excellent absorber of the fusion neutron energy.

Liquid lithium raises fire safety concerns. However, if the levels of radioactivity truly pose an insignificant environmental threat, then the fire hazard of this reactor system requires only those precautions afforded other large fire hazards, such as municipal natural gas storage tanks. If that were the case, there would be no need for the very expensive containment structures typical of fission reactors.

Operating parameters for a compact blanket fusion reactor must lie within six fundamental constraint boundaries:

(a) the tritium breeding ratio must be greater than unity, (b) the impulse must be contained by a vessel with stresses not exceeding material strengths in the short pulse limit, (c) the impulse must be contained by a vessel with stresses not exceeding material strengths in the long pulse limit, (d) the chamber size must not be unreasonably large, (e) the power required to circulate liquid lithium must not be a large fraction of total plant power, and (f) the velocity of the lithium, after shock and relief, must be sufficient to prevent significant magnetic field diffusion into the lithium.

Figure 4:
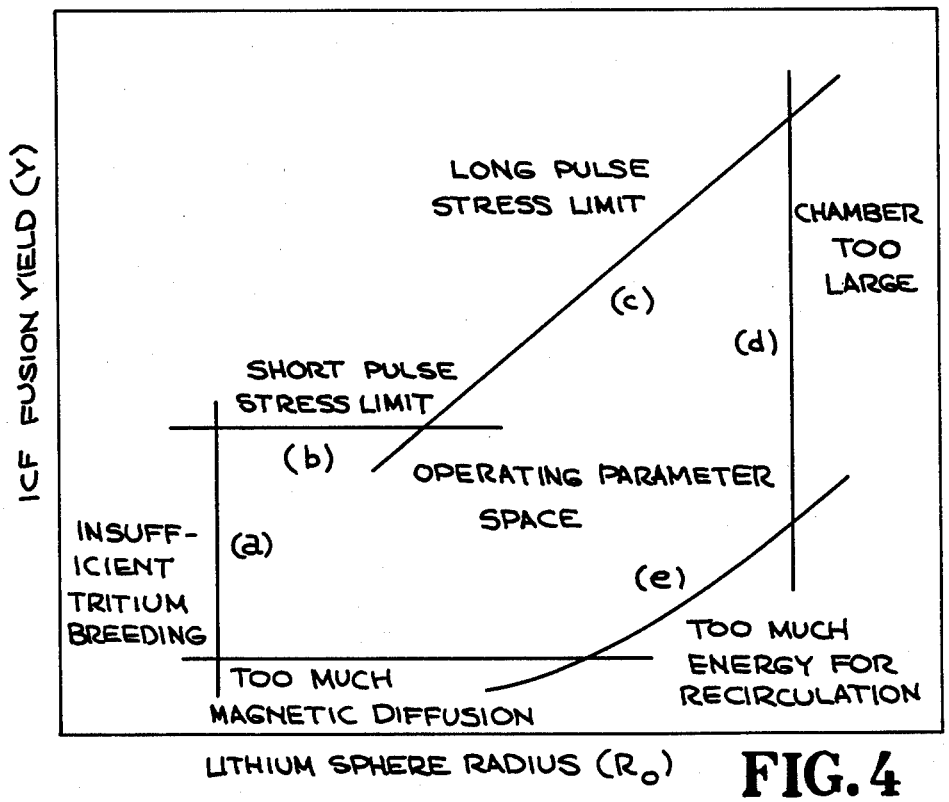
FIG. 4 shows operating parameter space for a compact blanket reactor design.

A particular operating point is determined by an optimization among competing desirable characteristics (e.g., low total cost, low radioactivity, and safety). Constraint lines defining operating parameter space in fusion yield and compact blanket radius are shown in FIG. 4.

Regardless of the yield, the lithium sphere must be of some minimum radius in order to breed more tritium than is burned and lost to decay and diffusion, shown as curve (a).

There are two limiting conditions which govern the maximum yield because a maximum wall stress is set by material properties, the short pulse limit (b) and long pulse limit (c).

If the physical size of a power plant is too large, it becomes too costly. A maximum chamber wall radius, beyond which construction is economically unattractive is shown as curve (d).

From economic considerations, the fraction of gross electric plant power, needed for lithium circulation must not be too large. If the total desired plant power is fixed by utility economics, the repetition rate, is inversely proportional to the yield. If the pump lift height is fixed by realistic reactor size, then the pump power for lithium recirculation is proportional to the product of the repetition rate and the volume of lithium per cycle. Therefore the yield is proportional to the third power of the sphere radius. This result is shown as curve (e).

A minimum yield is set by the requirement that the liquid metal have a high magnetic Reyholds number—in order to be stopped by magnetic pressure against its surface, it must displace the magnetic field much faster than the field can diffuse into it. For a step-function magnetic field disturbance, the magnetic diffusion time is proportional to the square of the diffusion depth. If the field rise time is short compared to the time required to stop the motion of the lithium, the magnetic diffusion time approximately equals the stopping time. If we require that the field diffuse into the lithium no more than some small fraction of its final shell thickness, we conclude that there is a constant minimum value of yield required to limit magnetic diffusion, shown as curve (f).

Two different design cases are considered as examples:

Sunburst, a reactor having lithium sphere radii of three meters and a yield of 1200 MJ, and Starburst, a smaller reactor having lithium sphere radii of one meter and a yield of 300 MJ.

In magnetic confinement schemes, neutron collisions in the first wall reduce the energy available for the (n,n'α) reactions with $^7Li$ and also, because of captures, reduce the number of neutrons available for (n,α) reactions with $^6Li$. For this reason, magnetic fusion reactors typically must have (1) a neutron multiplier and (2) isotopically-enriched lithium. For example, the STARFIRE tokamak has a 5-cm-thick lead zircate neutron multiplier between two 1-cm-thick steel walls and, in addition, the lithium in the breeding blanket must be isotopically enriched to 60% $^6Li$. Since $^6Li$ is the minor isotope of lithium, and the tokamak blanket volumes are large, such enrichment could be a major expense. The compact blanket reactors require neither isotopic enrichment nor neutron multiplication. For example, in HYLIFE, reflections account for increasing the thermal flux by a factor of about five, and the (n,α) reaction witn $^6Li$ has a very large cross section for thermal neutrons.

Figure 5:
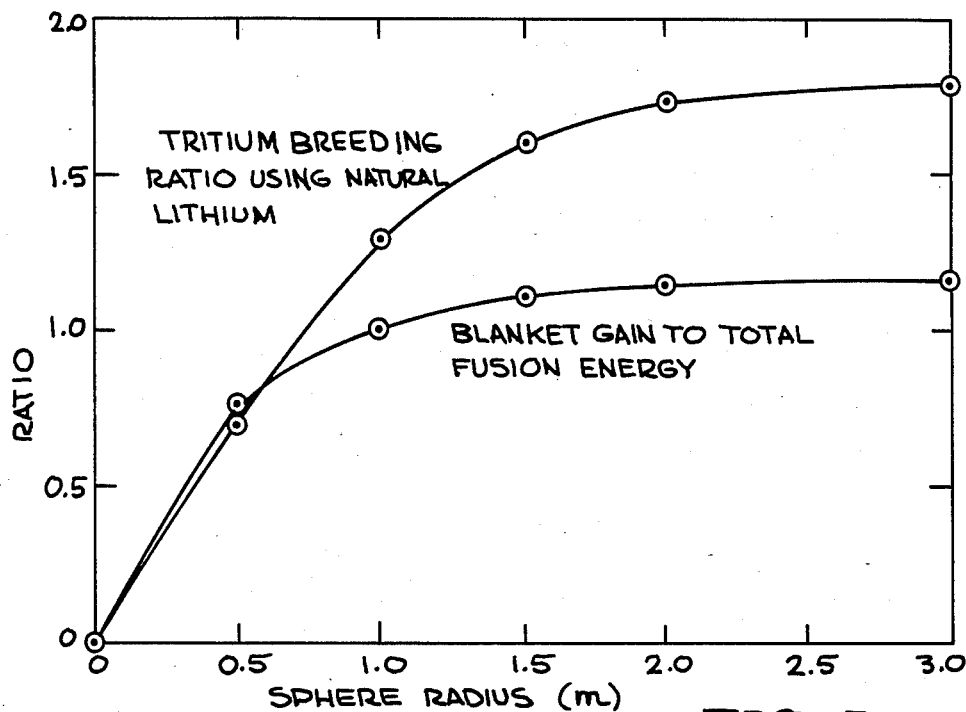
FIG. 5 illustrates tritium breeding ratios and blanket gain for compact blankets.

The tritium breeding ratios for spheres of pure lithium are shown in FIG. 5. Also plotted in FIG. 5 are the fusion energy multiplication factors, which were calculated by adding the total neutron energy deposited in the fuel and in the lithium to 3.52 MeV, and then dividing by 17.6 MeV.

From FIG. 5 the minimum radius for a compact blanket for tritium breeding is about 70 cm. Although there is not a great incentive to use blankets much larger than this from the point of view of either tritium breeding or of energy multiplication, thicker blankets have the advantage of greatly reducing the neutron flux in the chamber wall. Reducing the neutron flux in the first wall reduces its radioactivity and increases its useful life.

Figure 6:
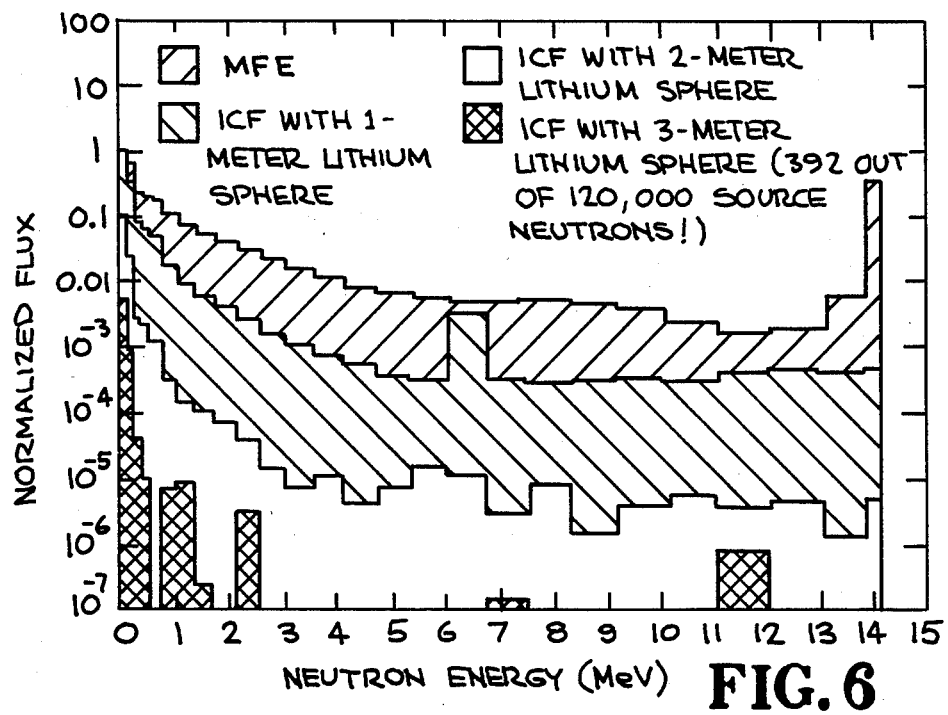
FIG. 6 shows the neutron flux for a 1, 2 and 3 meter compact blanket reactor compared to conventional fusion reactor.

To determine the extent to which the reduced neutron flux in compact blanket chamber walls reduces the neutron-induced radioactivity and increases the useful chamber-wall life, the results for a range of sphere radii are compared to those for a typical drywall fusion reactor in FIG. 6 and represent the average total neutron path length in each energy group per source neutron in the chamber wall, divided by the thickness of the chamber wall and also by the width of the energy group to obtain a normalized neutron flux spectrum for lithium sphere radii of 1, 2, and 3 m. This normalized spectrum can be converted to a standard flux spectrum by multiplying by the number of fusion reactions per second and by dividing by the area of the chamber wall.

To understand the important advantages resulting from the reduced neutron flux compared to more conventional fusion reactor systems, a "typical" magnetic fusion reactor was also modeled, and is also shown in FIG. 6. The great difference in chamber wall flux is evident from FIG. 6 where the ordinate spans a factor of 1,000,000,000.

The flux of neutrons and their energy content in magnetic fusion reactor chamber walls is so high that the walls become extremely radioactive and, in addition, must be replaced every few years because of helium embrittlement (from induced n,$\alpha$ reactions) and from damage due to atomic displacements. For example, the STARFIRE tokamak walls will have a radioactivity of more than 5 billion curies and must be replaced every four or five years. With compact blanket reactors, the chamber walls suffer a much softer and weaker neutron flux, which increases wall lifetime and reduces induced radioactivity. The magnitude of the advantage for each corresponds roughly to the attenuation of the energy and the flux in FIG. 6.

Figure 7:
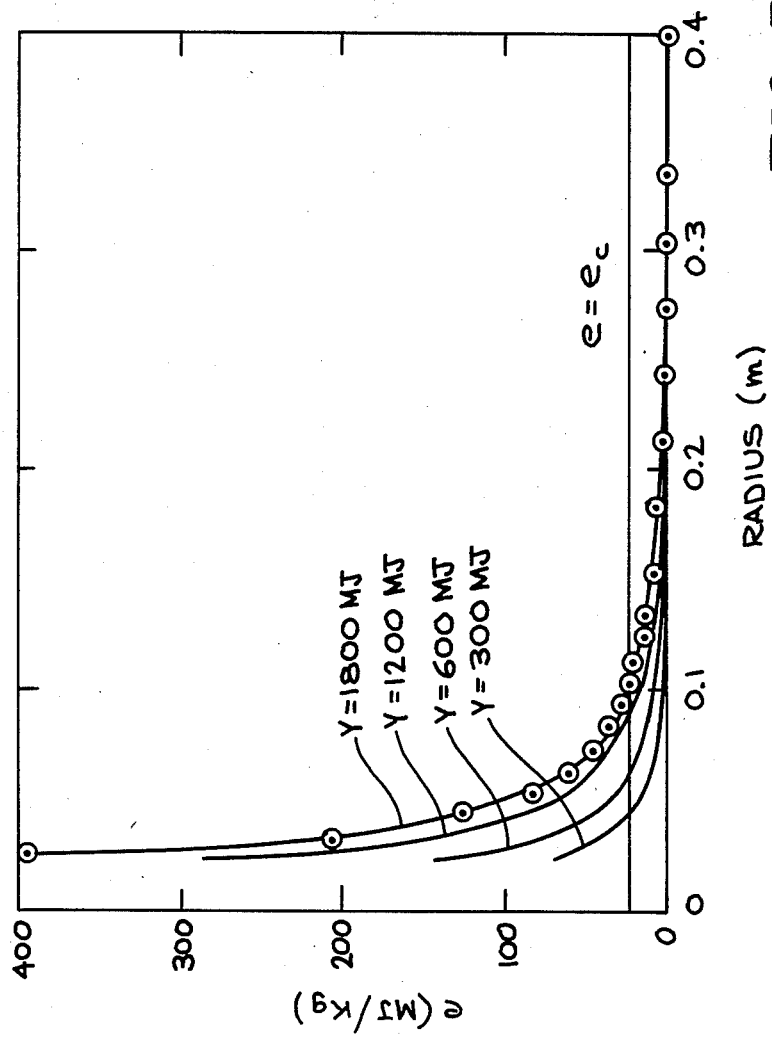
FIG. 7 shows a neutron energy deposition profile.

The neutron energy disposition profile for compact blanket reactors is plotted in FIG. 7 for a range of fusion yields.

The amount of energy that escapes the fusion plasma through the access tubes before they become opaque with high-density lithium gas is insignificant. The extracohesive gas—initially at solid density—erupts from the inside surface of the tube near the center of the sphere after being intensely heated due to neutron energy deposition. The energy loss from the fusion plasma through the access tubes by radiation loss is of five kinds: neutron free streaming, initial hard x-ray losses, charged-particle free streaming, blackbody radiation, and brehmsstrahlung.

The greatest of these is the free-steaming and scattered neutron energy loss (1.28%). Initial hard x-ray losses can be no more than 0.24% of the yield. The loss-fraction for charged-particle free-steaming is $1.99 \times 10^{-5}$ of the yield; for black-body radiation, $5.93 \times 10^{-5}$; and for brehmsstrahlung, $1.6 \times 10^{-7}$.

Figure 8:
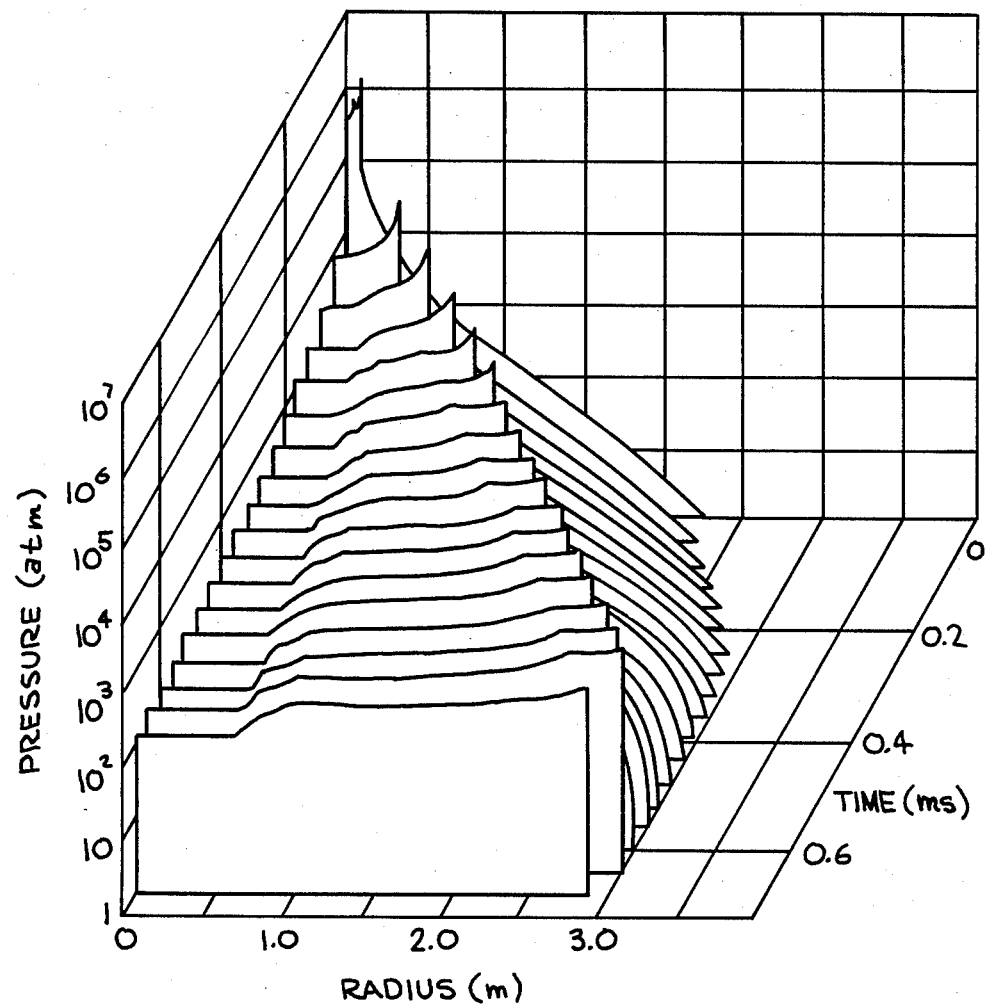
FIG. 8 shows calculated pressure response of 3 m lithium spnere to 1200 MJ ICF yield at its center.
Figure 9:
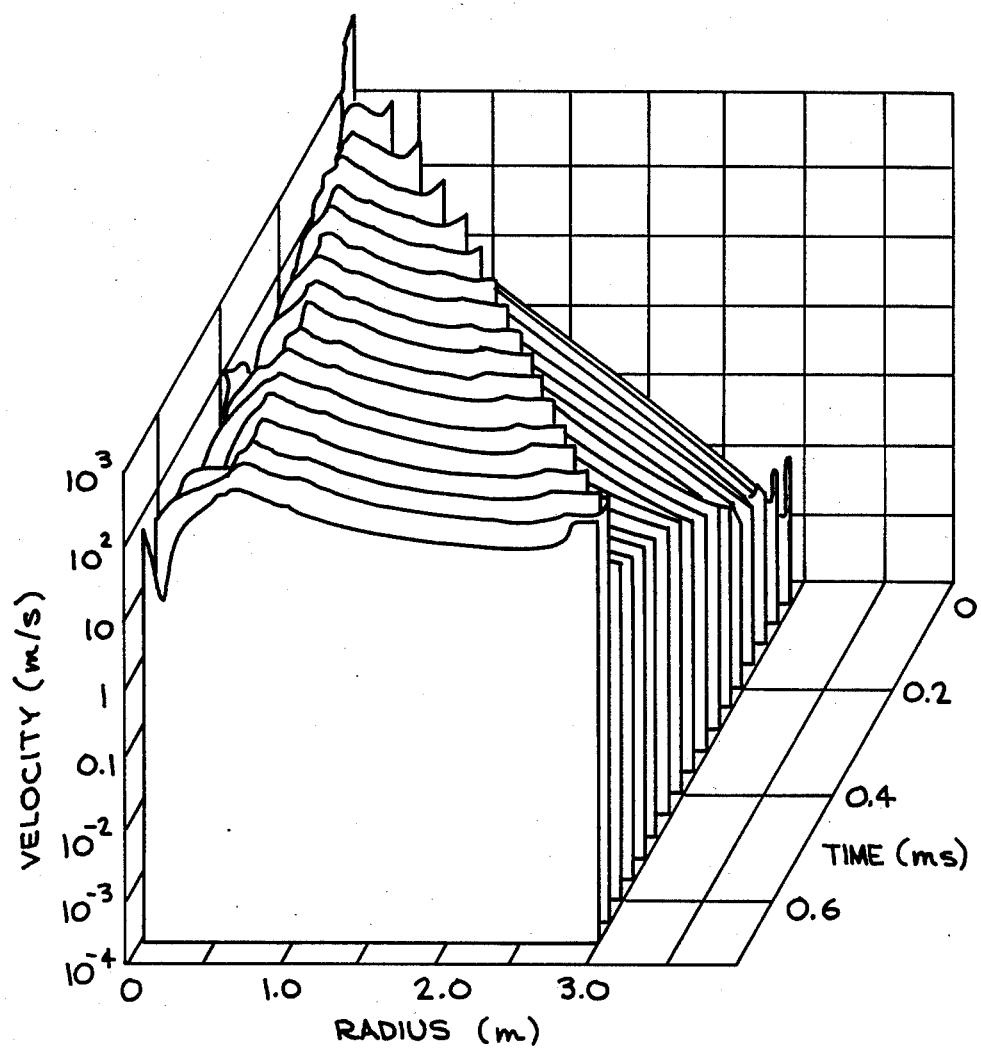
FIG. 9 shows calculated velocity response of 3 m lithium sphere to 1200 MJ ICF yield at its center.
Figure 10:
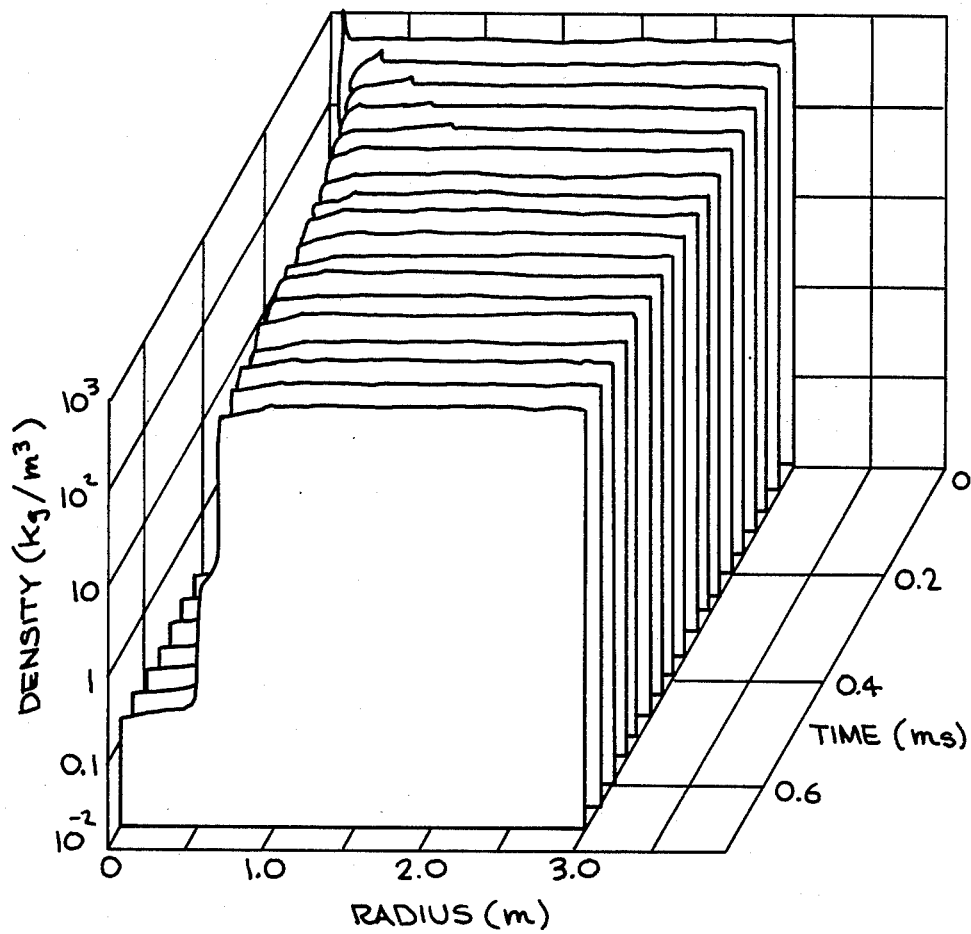
FIG. 10 shows calculated density response of 3 m lithium spnere to 1200 MJ ICF yield at its center.

Results of hydrodynamic calculations are shown in FIGS. 8, 9 and 10. These figures show the time-resolved velocity, pressure, and density distribution in a 3-meter lithium sphere following a 1200 MJ fusion yield from a compressed ICF plasma at the center.

The shock wave can be seen as the sharp discontinuity in pressure and velocity and as a small ripple in the density profile. The unusual shape ahead of the shock wave is due to the initial neutron energy deposition in the lithium.

The extracohesive region is most evident in the density profile. In this region, the high temperature compensates the low density so that similar pressures exist in the gas and in the liquid lithium.

Although there are many computer zones in this region (as can be seen from the velocity distribution there) the pressure remains almost perfectly uniform throughout the extracohesive region at all times. Such uniform pressure indicates that the speed of sound is large compared to fluid velocities.

With these results, we are able to describe how the fusion yield energy is divided among vented gas through the access tubes, outward-directed kinetic energy, internal energy of the extracohesive gas, and residual heat in the lithium from neutron deposition and irreversible shock coupling. In the calculation, energy was leaked from the extracohesive gas to simulate pressure loss due to mass flux through the access tubes. At the time the shock wave reached the surface of the sphere, only 1.88 MJ (0.16% of the fusion yield) had vented through the access tubes.

The outward-directed velocity of the liquid lithium, after pressure relief, was 135 m/s. This corresponds to a kinetic energy density of 4.42 MJ/m$^3$. This kinetic energy density corresponds to a total kinetic energy of about 41.6% of the yield. Most of the energy was transported into the lithium by the shock wave before significant fluid motion could take place (fluid velocities are on the order of hundreds of meters per second, and the shock propagated 3 meters in 0.6 ms—a much greater average velocity of about 5000 meters per second).

Only 21.5 MJ—about 1.8% of the yield—remains in the extracohesive gas at the time the shock reaches the surface.

The remainder of the energy—about 56% of the yield—is neat in the liquid lithium which will be converted to electricity in the thermal cycle.

Figure 11:
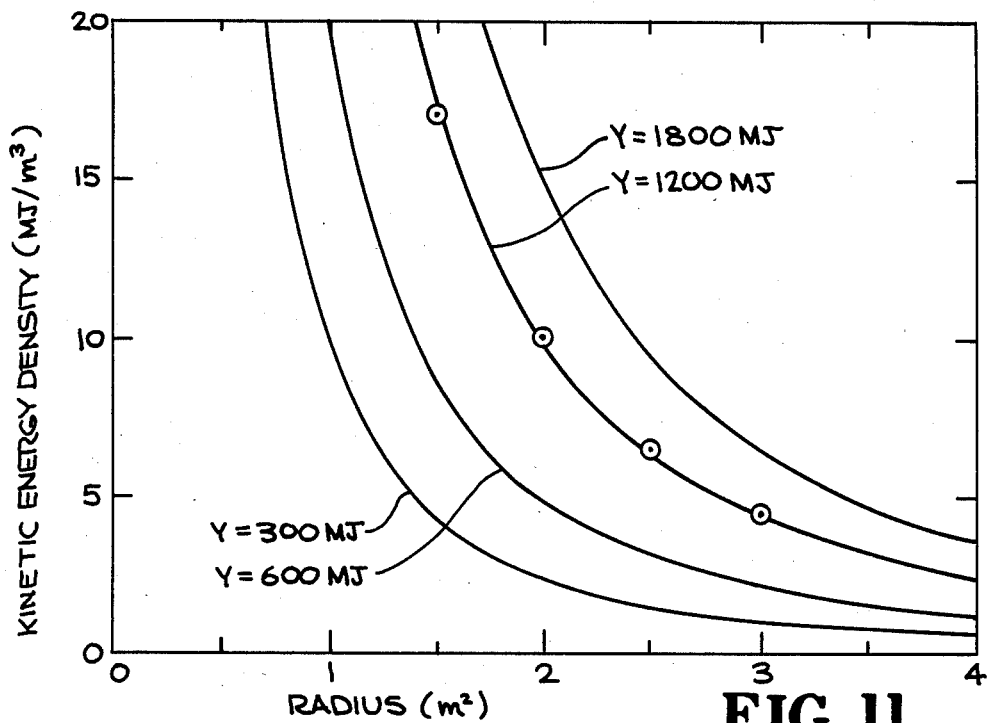
FIG. 11 shows the kinetic energy density as a function of yield.

To compare the advantages of compact blankets with different radii and different yields, the kinetic energy density, after shock and relief is shown in FIG. 11.

A pnenomenon often associated with the reflection of shock waves is spall, in which pieces of a free surface break off at high velocity after shock reflection. In spall the separation takes place at a depth where the tensile stress of the wave falls below the tensile stress limit of the solid. The "spall" layer, in this light, is the entire mass of the lithium, since there is no depth at which the tensile stress needed to prevent separation can be supported by the liquid. Therefore, classical spall from shocks reflected from solid free surfaces does not occur for liquid compact blankets, and the energy deposition from inertial fusion can be used to create a nearly ideal liquid piston moving at constant velocity.

The surface of the compact blanket after shock and pressure relief, is approximately unchanged in its radius, out has a uniform outward-directed velocity which is a predictable function of yield and sphere radius (FIG. 11).

The minimum stopping distance of the surface of the lithium sphere is found by equating the displaced magnetic field energy with the initial kinetic energy of the lithium.

If the external impedance of the magnet conductors is dynamically adjusted so that the magnetic field remains at the highest value permitted by the strength of the chamber wall, the lithium can be stopped in the shortest time, in the shortest distance, and with the least total magnetic field energy. These factors are desirable for overcoming instabilities, reducing the total chamber cost, and reducing the total pulsed power requirements.

Figure 12:
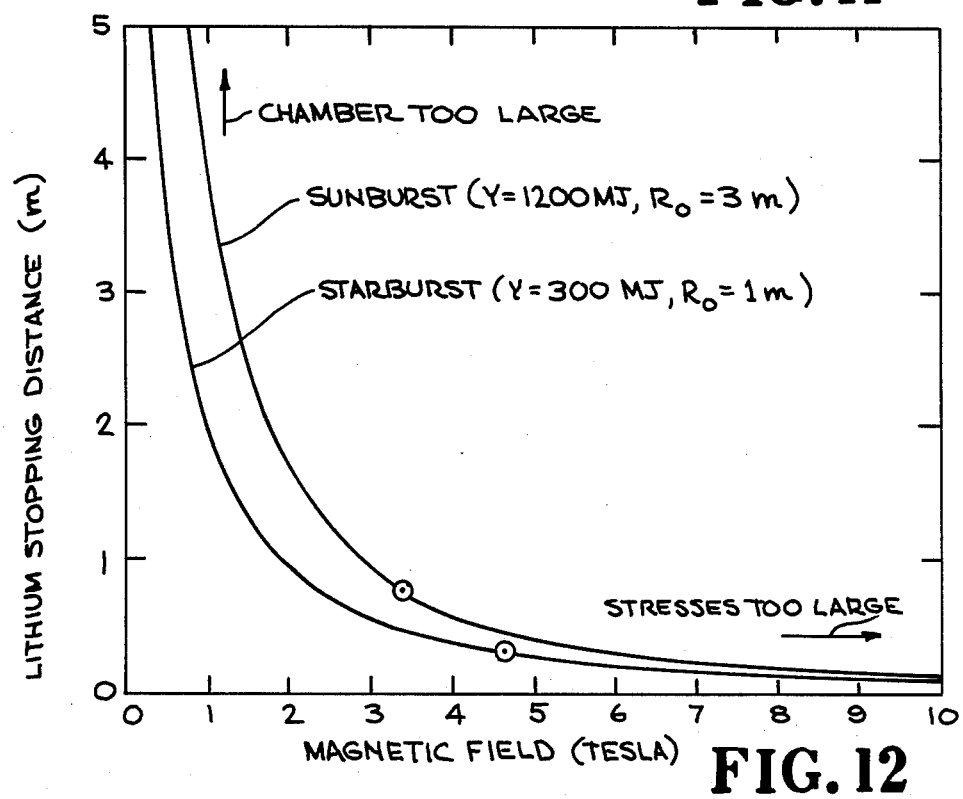
FIG. 12 is a plot of the stopping distance as a function of magnetic field.

In the homogeneous field approximation the stopping distance as a function of the applied magnetic field is shown in FIG. 12 for Sunburst and for Starburst.

From FIG. 12, for both of these reactor operating points in yield-radius space, the lithium motion can be stopped within a reasonable distance (less than two meters) with reasonable magnetic fields (less than seven tesla).

Having found the stopping distance, the stopping time is estimated by assuming constant deceleration, which is equivalent to maintaining constant field magnitude and requiring small radial displacement.

As the lithium sphere increases in radius during deceleration, it will progress from a solid sphere to a thin shell. The liquid lithium surface inside the shell will be stable, held in place by its own inertia as the liquid decelerates. The outer surface, however, is unstable and will develop flutes parallel to the field. The motion of the sphere must be stopped before these flutes grow so large that they break through the lithium shell (this will interrupt the surface current which provides the jxB retarding force).

Figure 13:
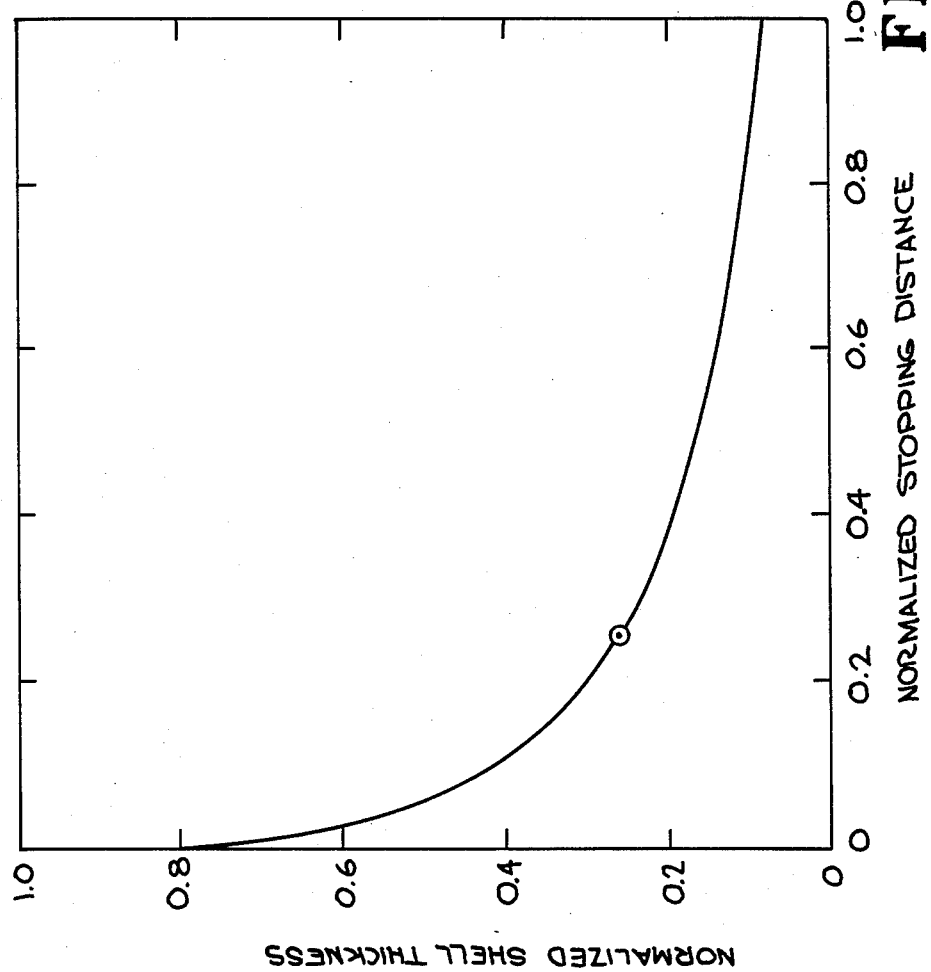
FIG. 13 is a plot of lithium shell thickness as a function of stopping distance.
Figure 14:
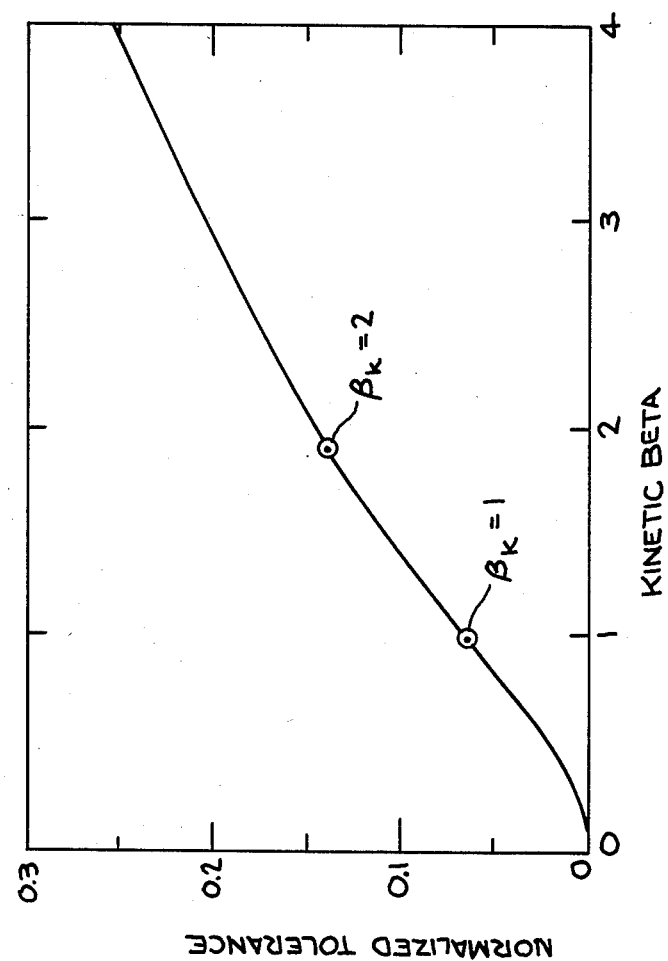
FIG. 14 shows the relationship between magnetic field and initial perturbations.

The lithium shell thickness as a function of its displacement is shown in FIG. 13. Since it is desirable to maximize both the shell thickness for overcoming instability and the stopping distance for reducing peak chamber stress, we may obtain a good first approximation of the optimum operating point by setting them equal to each other.

This point is shown as a circle in FIG. 13, and corresponds to setting the magnetic field energy density equal to the initial kinetic energy density. We will call this the point at which $\beta_k$, defined as the ratio of the magnetic field energy density to the initial lithium kinetic energy density, equals one. This trial operating point is shown as circles on the operating lines of FIG. 12.

The magnetic field, acting like a gas pushing against a liquid, will "work its way" into the lithium. If it gets too far, it will break up the lithium shell, interrupting the surface current. In the absence of a jxB force, the lithium would be free to impact the chamber wall with no further impediment.

The lithium is decelerated by interaction with the magnetic field, which can be thought of as the light fluid in a Rayleign-Taylor unstable interface. For small amplitudes, the modes grow exponentially in time with the square root of the product of the wavenumber and the acceleration. For large amplitudes, they grow much slower (quadratically in time).

In the MHD case, there is a stabilizing component parallel to the field lines, and the instability takes the form of flutes running parallel to the field axis.

Rayleigh-Taylor instability on the surface between the inner gas and the liquid lithium is unimportant for three reasons: (1) The shock wave transports energy outward into the lithium before significant fluid motion of the lithium occurs. (2) Initially, the instability growth rate is zero, since the gas and the liquid have equal densities. (3) The pressure gradient, typical of a blast wave, is initially outward-directed and therefore stabilizes against instability until the time that the relief wave arrives at the gas-liquid surface (see FIG. 8).

After that time, the lithium is decelerated constantly by the magnetic field—this direction of acceleration insures the continued stability of the interface between the extracohesive gas and the liquid lithium. Furthermore, the pressure of the internal gas continues to decrease in time due to expansion and also due to venting.

The growth-rate transition from exponential to quadratic begins when the instability departs from the sinusoidal—when the amplitude exceeds the inverse of the wavenumber. Therefore, if the initial surface irregularity amplitudes are equal for all wavelengths, catastrophic "punch-through" first occurs for the mode whose wavenumber is about equal to the inverse of the average final lithium shell thickness, since it is the fastest-growing mode that will not have saturated.

If the sphere is perfectly spherical and perfectly smooth, the initial perturbations are zero for all wavelengths and the instability amplitudes remain zero for all time. Obviously such perfect spherocity cannot be achieved, but this observation clearly shows that there exists some degree of smoothness which will prevent instability amplitudes from growing to the thickness of the lithium shell by the time the motion of the lithium has been stopped.

For a magnetic field energy equal to the initial kinetic energy density ($\beta_k = 1$), the maximum initial perturbation amplitude is 6.32% of the sphere radius and the critical wavelength for these perturbations is about one fourth of the circumference. For Starburst, the maximum perturbation amplitude is 6.3 cm at a critical wavelength of 1.6 m, and for Sunburst, 19 cm at a wavelength of 4.9 m. These allowed perturbation amplitudes are so large that mecnanical formation of a sufficiently smooth liquid compact blanket seems to be quite feasible.

There are two methods by which fluid instability can be overcome in the event perturbation amplitudes of less than the critical cannot be achieved. In the first method, a thin surface layer of the lithium sphere is quickly frozen just prior to release, to be melted in flight by thermal diffusion, or to be melted by ohmic heating when the magnetic field is applied. If the compact blanket is sufficiently smooth when formed, it will remain so even if the frozen layer melts because it is in free fall in vacuum.

The second method is to decrease the stopping distance by applying a larger magnetic field.

With our trial operating point of $\beta_k = 1$, fluid instability on the outer surface of the lithium can be overcome if the sphere is formed within a reasonable smoothness tolerance. This tolerance can be approximately doubled by increasing the applied magnetic field to values of 7.0 and 4.7 tesla, respectively, for Starburst and Sunburst.

The instability amplitude and the stopping distance can be used to determine a chamber wall radius. If we do not wish the lithium to come in contact with the chamber wall before it has been arrested, we must allow not only for the increase in average radius of the sphere, out also for the largest expected instability amplitude. Thus, the minimum chamber radius is 52% greater than the compact blanket radius.

Because larger chambers are more expensive to construct, require more total magnetic field energy, and require greater wall thicknesses to contain the same impulse, the value for the minimum wall radius will be taken to be the optimal wall radius.

For Starburst the chamber wall radius is 1.52 meters and for Sunburst, 4.56 meters. These values apply for our operating condition of $\beta_k$ of unity. With a $\beta_k$ of two, the wall radii would be only 1.29 and 3.88 meters, respectively. These are unusually small chamber sizes, and may make construction considerably less expensive.

For our trial operating points with $\beta_k = 1$, Starburst would require a total current of 7.89 MA for its 4.96 T field, and Sunburst 15.8 MA for its 3.31 T field. The induced surface currents in the lithium are of the same magnitude. With a $\beta_k$ of two, the induced surface currents would be 11.2 and 22.3 MA, respectively.

For the $\beta_k = 1$ case, the initial inductance of the Starburst system is 2.58 μn, and for Sunburst, 7.76 μn. The initial inductances for $\beta_k = 2$, for which (the chamber wall radius) $R_w = 1.29 R_0$ (the initial lithium sphere radius), are 1.31 and 3.93 μn for Starburst and Sunburst respectively.

It is important that the magnetic field rise time be short compared to the lithium stopping time if resistive losses and magnetic field diffusion in the lithium are to be small. In order to get the shortest rise time, we will apply a constant voltage from the power source. During the short time that the magnetic field is rising, the sphere retains its original radius, and diffusion of the magnetic field into the lithium is negligible. With a constant sphere radius the system inductance will be constant.

The required voltages for "instantaneous" field risetimes are therefore 82.7 kV for Starburst and 111 kV for Sunburst for the $\beta=1$ trial operating point. With a $\beta_k$ of two, the stopping times are 1.37 and 6.21 ms for Starburst and Sunburst, the required voltages would be 107 and 141 kV, respectively. Thus, the required voltages for a magnetic field rise time short compared to the lithium stopping time are easily attainable within the limits of current technology.

Because of the finite conductivity of lithium, the magnetic field will diffuse into the lithium to some depth. There are two reasons why it is important to limit the field diffusion to a small depth of the lithium thickness. First, excessive diffusion means that the minimum radius of the chamber wall must be increased to account for the extra "reach" of the lithium, and larger chambers are more expensive. The greater stopping distance also means thinner lithium shells and consequently more stringent smoothness requirements for overcoming fluid instability. Second, the total resistive heating is increased, and the conversion efficiency from heat to electricity is not as large as it is from magnetic field compression to electricity.

Even though some diffusion is undesirable, it is not catastrophic. Kinetic energy is converted to eddy current heat where magnetic diffusion occurs, retarding the motion of the system. The eddy current heat in the liquid lithium energy is partially converted to electricity in the thermal cycle. Also, if the diffusion is limited to a fraction of the final lithium thickness, the stopping distance will be nearly the same as for no diffusion, and the smoothness required to prevent instability "punch through" is not much greater.

For Starburst and Sunburst at a $\beta k$ of one, the magnetic diffusion length is 2.80 cm and 5.92 cm respectively; at a $\beta_k$ of two, 2.09 cm and 4.45 cm. These values are all less than eleven percent of the final lithium shell thickness. Thus, the magnetic field is effectively excluded from the lithium and can be treated as an exterior compressible gas.

A minimum yield in operating parameter space which corresponds to the requirement that this diffusion be limited to 20% of the shell thickness, is 115 MJ for the $\beta_k=1$ case, and is 40.6 MJ for the $\beta_k=2$ case. Thus, the compact blanket system is capable of handling the lowest yeilds contemplated for ICF, as well as yields higher than considered for any other system.

We now calculate the resistive heating due to induced surface currents. The compact blanket can be tnought of as the secondary of a transformer. The current induced in the lithium because the local magnetic field is changing causes resistive heating of the lithium. In this way energy is passed from the power source into the lithium. This heat energy is not lost—it is heat added to the primary coolant and is partly recovered as electricity in the thermal cycle. The total resistive heat loss for Starburst and Sunburst at $\beta_k=1$ is 11.0 MJ and 93.6 MJ, respectively; and for $\beta_k=2$, 15.1 MJ and 127 MJ.

Since the same magnitude of current flows through the magnets for the same time as it does through the lithium, the resistive heat loss in the magnets is roughly that of the lithium multiplied by the ratio of the conductivity of the lithium to that of the magnet conductor. Comparing the conductivity of liquid lithium at 773K to that of aluminum at room temperature, the heat lost to the magnet conductors is 7.08% that of the lithium. This heat, however, cannot be recovered as electricity because it is "low grade" (low temperature) and does not reside in the primary coolant.

Figure 15:
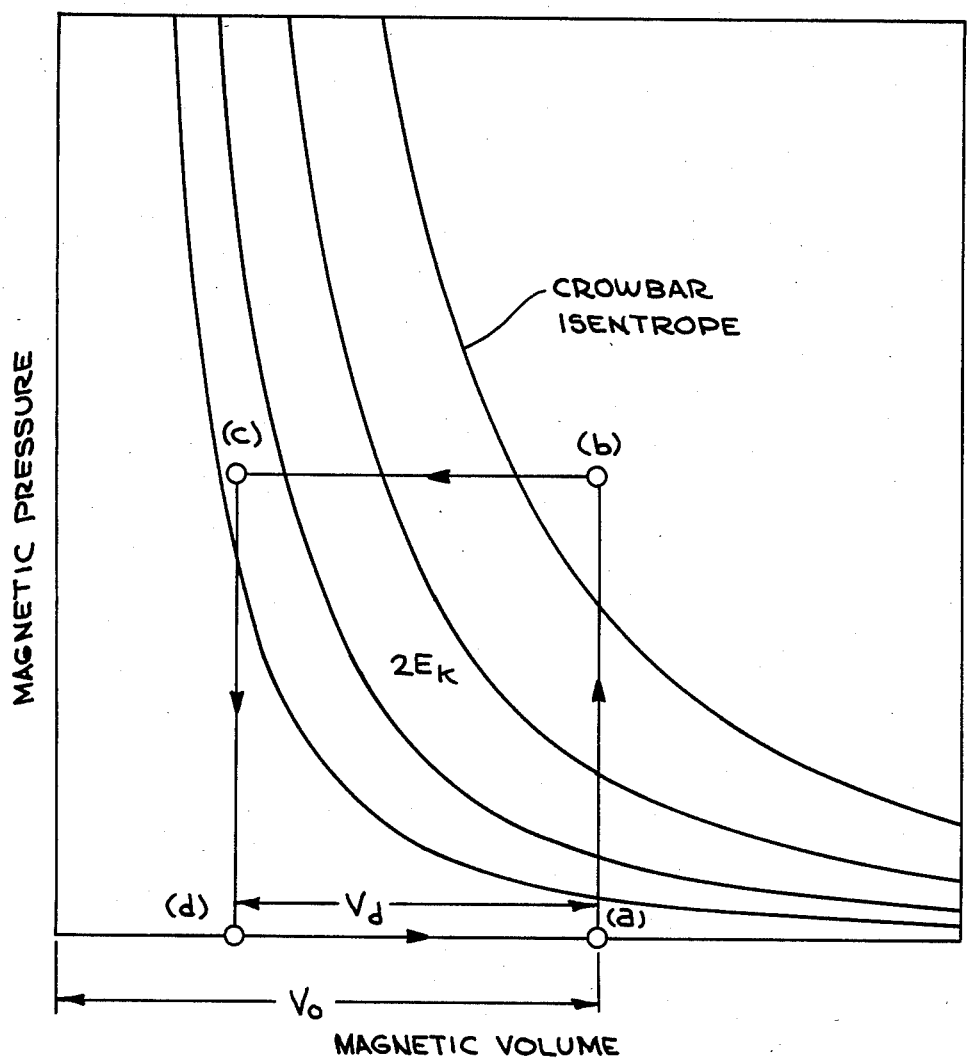
FIG. 15 is a plot of a ideal MHD work cycle.

An ideal work cycle as shown in FIG. 15, in wnich we begin at point (a) with the compact blanket having reached the center of the chamber with, as yet, no magnetic field. The magnetic field is then quickly brought to its full value at (b), before the sphere has begun expanding and is maintained at a constant value until the lithium motion is stopped at point (c), after which it is quickly brought to zero at point (d). The energy of the magnetic field from point (c) is stored either capacitively or in low-impedance rotating machinery, shunted there with fast-closing switches.

Since there will be magnetic field remaining in the volume between the instability peaks when the lithium is stopped, the magnetic field volume at point (c) is not zero. This "instability volume" can be reduced, if desired, in the same way instabilities are controlled—with smoother spheres or with higher applied magnetic fields.

The work done by the system on the load for the leg from (a) to (b) is the product of the initial magnetic field volume and the magnetic field energy density. On this leg, the source voltage is the time rate of change of the magnetic flux and the motion of the piston is negligible.

On the leg (b) to (c), the load potential is adjusted so that a constant magnetic field is maintained and so that the lithium is brought smoothly to rest. The current, proportional to the magnetic field, is also constant. Because the displaced field energy equals the initial kinetic energy, the work done on the power supply must be equal to the kinetic energy of the lithium plus the energy of the displaced magnetic field, and equal to twice the initial kinetic energy of the lithium.

On the leg (c) to (d), the magnetic field energy remaining in the instability volume must be quickly recovered. At point (c), the load potential has already been brought to nearly zero. This corresponds to a "crowbarred" magnetic field. One way to get this energy out is to store it capacitively. At the load, the potential drop is nearly zero, so fast-closing switches (such as the "power valves" used by the utility industry today) can first connect a completely discharged capacitor bank in parallel across the load, and then a fast-opening switch can interrupt the current path through the load. The fast-opening switch should not be a technological proolem because the voltage across the switch, with a large discharged capacitor bank in parallel, is initially zero. If "power valves" are used, the energy would be prevented from ringing back out of the capacitors into the magnet because power valves are actually large silicon-controlled rectifiers.

The leg (d) to (a) represents, of course, the draining of the previous compact blanket and the entry of the next one, at a time when the magnetic field is zero.

The complete cycle, as described, is 100% efficient. All of the lithium kinetic energy was directly converted to electricity, and all of the excess magnetic field was recovered. Actually, the cycle is not 100% efficient because of resistive losses in the magnet conductor, resistive losses in the lithium, and resistive losses in the source/load system. The first two have been accounted for; for the latter we will assume an efficiency typical of present-day utility power conditioning systems of 93%. Also, for kinetic energy lost axially to MHD generation or thermalized by random fluid motion, we will allow for 10% of the kinetic energy to the converted to heat instead of directly to electricity.

The initial magnetic field energy must be equal to the initial kinetic energy in the lithium, increased by a factor between one and two to allow for the instability volume. If the sphere is perfectly smooth, there is no instability volume and this factor approaches one; if the initial perturbations are of the maximum permissible size, the factor is two. (Because of continuity there will be as much fluid beyond the average final radius as there is void behind it. If the instability amplitudes are equal to the final lithium shell thickness, as is the case with maximum initial perturbations, then the volume filled by magnetic field after the lithium stops will be equal to the volume of the lithium.)

For Starburst, the total energy of the magnetic field is 41.0 to 81.9 MJ; for Sunburst, 492 to 984 MJ. The reactor electrical system must be capable of supplying this much energy to the magnets in a field rise time; it must be capable of storing a pulse from the magnet of this amount plus an additional 41.0 or 492 MJ, respectively, from work done by the energetic lithium; the initial load potential of Sunburst and Starburst at $\beta k_k = 1$ is 8.23 kV and 6.17 kV respectively; at $\beta_k = 2$, 11.6 kV and 8.75 kV and is decreased constantly over the stopping time if constant magnetic field is desired. Because these voltages are not exceedingly high, construction and design of loads at these ordinary potentials is not technologically difficult.

The work cycle of FIG. 15 may be altered by adding a "crowbar" leg, in which the source potential is brought sharply to zero (a dead short) at some point along leg (a) to (b). In that case, by Faraday's law, the magnetic flux is trapped within the chamber volume and remains constant to the extent that the chamber walls are perfect conductors.

The energy of the lithium is then converted directly to magnetic field energy as we how follow a "crowbar isentrope" (so named because the process is reversible) to a point on leg (b) to (c), from which we must follow leg (b) to (c) to point (c) or risk structural failure. These crowbar isentropes are also shown in FIG. 15.

Along these isentropes the combined energy of the magnetic field and the lithium is constant because no power is delivered to the load, for which the potential is zero. The work done on the load is zero, and therefore the change in kinetic energy of the lithium is equal to the increase in magnetic field energy as given by the change in the product of magnetic pressure and magnetic volume along the crowbar isentrope. The endpoint values are calculated by requiring that the product of the magnetic pressure and the square of the magnetic volume remain constant.

The advantages of adding such a leg are that we need not store as much magnetic field energy, and that we need not apply such a high voltage to achieve the required rise time for the initial magnetic field.

However, if a crowbar isentrope is followed to compress the magnetic field, the lithium stopping time is increased because the maximum magnetic pressure is not applied during the entire time of deceleration of the lithium. Consequently, following a crowbar isentrope requires larger chambers and increased lithium sphere smoothness.

We may also follow a crowbar isentrope from point (c) back to the intersection with the leg from (a) to (b). If so, there will be more time to recover the field energy remaining in the instability volume, but the resistive loss in the magnet conductors will increase. Unlike the resistive loss in the liquid lithium, this resistive loss cannot be partly recovered in the thermal cycle. Therefore, it is preferred not to follow an isentrope from point (c), but rather to follow the leg from (c) to (d) as shown in FIG. 15 if possible.

The load potential must be smoothly decreased to a much lower value than its initial value over the stopping time to maintain a constant value of the magnetic field between the lithium and the chamber. There are two possible methods to accomplish energy storage with a constantly decreasing load potential.

One device, which can provide a combination load and source capable of smoothly decreasing the load potential, is a homopolar generator. Energy is stored in rotating disks with brush contacts at their axes and around their circumferences. A magnetic field—the "excitor field"—passes perpendicularly through the surface of these disks.

To cnange potential at the nomopolar generator, we need only vary the strength of the excitor field. If the excitor field is brought to zero, then no Hall voltage is generated by the motion of the disks, and the generator acts as a dead short. Therefore, to smoothly bring the load potential to zero, we would bring the excitor field to zero in an accelerated way that compensates for the increased rotational velocity of the disks due to the increased stored energy. Similarly, the potential may be reversed to change from load to source by reversing the direction of the excitor fields. Also, constant power can be delivered to the line load by increasing the value of the excitor fields to compensate for decreasing angular velocity during the time between fusion pulses.

Homopolar generators, as they can be purchased today, have the following general characteristics:

(1) Maximum potential of about one kV. To use them, we would either have to segment the magnet chamber so that each generator drives a portion of the total azimuthal angle or we would place several sets of generators in series. This is a serious limitation.

(2) Cost of 2 to 3 cents per stored joule. This compares closely to capacitive energy storage cost of 2 to 2.5 cents per stored joule.

(3) Ability to transfer full energy storage, about 20 to 50 MJ, in three to five ms. In this respect, homopolars seem well suited for compact blanket reactors, especially those with longer stopping times.

As an alternative to rotating macninery, the magnet system could be connected in parallel to a large capacitor bank through "power valves". Because the valves are diodes, current from the magnet can only flow into the capacitors through an activated power valve connected to load capacitors. Although requiring a different work cycle than shown in FIG. 15, the capacitance might be matched to the inductance of the magnet so that the stopping time corresponds to one-fourth of the resonant L-C period—initially discharged capacitors could then fully charge during the stopping time. If a DC line load, connected in parallel across these capacitors has a real resistance so that the R-C discharge time equals the time between fusion pulses, then the electric coupling cycle is complete. (Direct current transmission is currently in use by the utility industry because it is more efficient.) At greater expense, larger capacitance could be provided if more constant power to the load is desired.

If we desire to decrease the load potential over the lithium stopping time to provide a constant magnetic field in the chamber we might (also at greater expense) successively bring capacitor banks of lower and lower potential across the magnet terminals—again, the power valves, which are voltage-switched diodes, would prevent the flow of energy back out of the higher voltage banks. power valves, which are voltage-switched diodes, would prevent the flow of energy back out of the higher voltage banks.

A complete electrical storage system with substation interface, energy store, switching, power transmission, and fast pulse isolation can be provided for less than 10 cents per stored joule for a 260 s discharge time. The stored energy is at most three times the initial lithium kinetic energy (for instability volume, displaced volume, and lithium energy). For Starburst and Sunburst, at all values of $\beta_k$, the expense for a storage capacity of three time the lithium kinetic energy is 12.3 and 148 M$ respectively. Compared to typical fission power plant direct costs of about 900 M$, these expenses do hot seem unreasonable for a commercial power plant.

The shock-induced kinetic energy can be efficiently coupled from the liquid lithium to the power grid without unrealistic technological extrapolation. The required voltages, energy storage capacities, and electrical switching do not appear unreasonable from either a technical or cost standpoint.

Also, the chamber size for compact blanket reactors can be much smaller than those of other fusion reactors, both magnetic and inertial. Even for the largest case, with high yield and loww magnetic field, the chamber is on the order of the smallest of other reactor chambers of other systems. Shaped as spherical shells with radii from 1.3 to 4.6 meters, compact blanket reactor chambers have exceptionally high energy density—this gives them the potential of being constructed for less expense.

The chamber wall must resist corrosion by hot liquid lithium, it must contain a conducting layer to act as the chamber magnet, it must not generate excessive internal Lorentz forces or resistive heating in the presence of changing magnetic fields, and it must safely withstand the stress which results from stopping the motion of the liquid lithium.

Many of the constraints that apply to other fusion reactors when making a choice of materials do not apply to the compact blanket reactor. Because of the very low neutron flux, there will be much less damage from helium embrittlement, lattice displacement, or chemical decomposition from neutrons. There will be no problem of x-ray induced wall erosion. We need no blanket behind the chamber wall, and need not worry about the effect of the wall material and wall thickness on tritium breeding. There will be no concern with thermal decay heat in the first wall (radioactive decay heat poses a meltdown problem for some current fusion reactor designs, such as STARFIRE, if active cooling mechanisms should fail). These factors allow an enormous simplification.

To demonstrate feasibility, one combination of materials which appears to satisfy the minimum requirements is suggested.

On the inner surface, a material must be provided which will resist corrosion by liquid lithium, provide thermal insulation for the magnet conductors and the structural wall material, and prevent the liquid lithium from electrically shorting the the magnet current. The three materials which appear to be best suited for these requirements are yttria, thoria, and zirconia. These all have a Gibbs' free energy that is less than that of lithia, and this energy difference increases with rising temperature. They are all ceramics, and, if kept cool, are good electric insulators.

Yttria has the lowest Gibbs' free energy of all, is low activating, is not fissile or fissionaole, and is a very good thermal insulator. In addition, it is more abundant on the earth's crust than lead or lithium. Thermal expansion of the chamber wall would place the insulator in compressive stress, because it is at a smaller radius. Fortunately, yttria, a ceramic, is best suited for compressive stresses.

The magnet conductor should have high electrical conductivity and low neutron activation. Although copper is a better conductor than aluminum, aluminum has very low activation characteristics. In addition, its light weight will lead to less dead weight stress in the chamber wall, and to less centrifugal stress if the chamber is of the rotating kind, shown in FIG. 2.

Aluminum also has very good thermal conductivity. To cool the chamber wall and to remove the resistive heat from the aluminum, we may provide channels inside the aluminum through which a chilled inert gas, such as helium, will flow. This gas could enter and exit along the armatures in the configuration of FIG. 2. This cooling will partly pay for itself energetically since the resistivity of aluminum decreases—and therefore also the resistive power loss decreases—at lower temperatures. Because the conductor is placed between the insulator and the structural material, inert gas cooling of the conductor could also cool the structural material.

The aluminum conductor will not have to carry any of the wall stress—its only purpose will be to carry current to produce the magnetic field (and, perhaps, to serve as heat collection and transfer medium). The expansive jxB force on the aluminum conductors will be transferred to the chamber wall structural material, with which it is in direct contact.

For the chamber wall structural material, electrically-conducting materials should be avoided because of the power consumption and induced Lorentz forces accompanying rapidly-changing magnetic fields. With analogy once again of the magnetic field to an ideal gas, the chamber will be stressed like a pressure vessel. We must therefore seek a material with strong tensile characteristics. One common construction material with high tensile strength and low electrical conductivity is fiberglass. Glass has the additional advantage of very low activation when subjected to a neutron flux.

Glass fiber epoxies, with enhanced toughness and crack growth inhibition, were used with the 2XII-B baseball magnet with tensile strengths of 322 MPa and an elastic modulus of 18.6 GPa. Because epoxies and other organic materials rapidly lose strength when subjected to neutron flux, they are not considered as chamber wall structural materials in other fusion reactor systems. In the Sunburst compact blanket reactor, however, there will be such a low neutron flux (see FIG. 6) that this may not be a problem.

Neutron damage to the glass itself is not likely to be an important concern. Because glass is amorphous and has no crystalline structure, there can be no neutron-induced lattice damage. Very few neutrons will have energies above the (n,) thresholds so there should be little concern, as there is with steel, with effects from internal helium production.

However, if a hydrocarbon matrix is used, such as an epoxy, neutrons can quickly alter its molecular structure and render it useless. The rate of damage to organic materials is roughly proportional to both the neutron flux and the average energy of the neutrons.

The typical integrated neutron energy flux for failure of organic materials is 2 to $3 \times 10^{18}$ MeV/cm$^2$. We may obtain the normalized energy flux per source neutron (sn) by energy-weighting the normalized neutron spectra in FIG. 6 and numerically performing an energy-normalized integral over all energies. This yields 15.01, 3.92. 0.0458, and 0.00161 MeV/sn for the MFE, 1-m, 2-m, and 3-m cases respectively (15.01 MeV/sn is possible with initial neutron energies of 14.08 MeV since this spectrum includes reflected flux). We can then obtain a neutron energy dose per cm$^2$ per cycle by multiplying by the number of fusion neutrons per cycle, and dividing by the wall area. The number of cycles to failure is the allowed limit divided by this dose rate.

For Starburst and Sunburst operating at $\beta_k=1$, the integrated dose is reached after 1738 and $9.52 \times 10^6$ cycles, respectively. This corresponds, assuming a repetition rate of one hertz, to almost one hour for Starburst and a little more than 220 days for Sunburst. Clearly, if an organic matrix must be used, the small-radius compact blankets are likely to be ruled out because of neutron flux damage—there will be a new, more stringent least-radius limit in operating parameter space than the one imposed by tritium breeding considerations. For $\beta_k=2$, the number of allowed cycles will be reduced by the square of the ratio of the radii, 0.72, giving 1251 and $6.85 \times 10^6$ cycles, respectively.

However, an organic matrix might not be required for compact blanket chamber walls. The matrix is not designed to carry tensile stress; rather, its function is primarily to provide shear strength support to the stress-carrying fibers. If a pressure vessel has a simple shape, such as a sphere or a cylinder, no matrix at all may be required. This may be the case for compact blanket reactor chambers, and would eliminate the organic material neutron dose concerns for smaller-radius compact blanket reactor chambers. Alternatively, it may be possible to use non-organic matrices, which would also eliminate the organic material neutron dose concerns, but these are only now being developed.

The actual stress limit may be somewhat higher than that used for 2XII-B (332 MPa). It may be estimated in the following way:

(1) Begin with the yield stress for glass fiber (500–600 kpsi, or 3447–4137 MPa).

(2) Divide by 2 for bi-directional stress for any pressure vessel.

(3) Multiply by 0.7 to account for volume loss due to the matrix.

(4) If a non-simple shape is used (such as was the case for 2XII-B but not necessarily for a compact blanket reactor chamber), additional strength reduction is required for forces not taken up entirely parallel to the fibers.

(5) Divide by the desired safety factor.

From these considerations it appears that, even with a safety factor of two, a stress limit of about 2 to 3 times that of 2XII-B can be used for compact blanket reactor chamber wall construction. However, we will calculate the required safe wall thickness using the lower 2XII-B stress values, because they are the more conservative. If the higher stresses are allowed because of the simple shape of our chamber, then the minimum wall thickness will be proportionately less than the calculated value.

Because the load is applied for a time which is not necessarily long compared to a mechanical resonant period of the wall, the usual steady-state hoop stress analysis is invalid. To determine the time-dependent stress resulting from the applied impulsive pressure, we must solve the equation of motion of the wall. The minimum wall thicknesses calculated with a maximum allowable stress of 332 MPa, are 5.00 cm and 6.65 cm for Starburst and Sunburst at $\beta_k=1$; and 10.6 cm and 13.9 cm at $\beta_k=2$. If fiberglass construction, including all expenses, costs $11/kg, then the Starburst and Sunburst chamber costs are 30.2 k$ and 36O k$ for $\beta_k=1$; and 46.1 k$ and 547 k$ for $\beta_k=2$. In comparison to typical power plant equipment costs, these expenses are quite reasonable.

After the impulse, the wall continues in alternating tensile and compressive stress due to underdamped ringing from the applied impulse. This "ringing" can shorten the useful fatigue lifetime of the chamber wall. In addition, if fibers are used, failure might occur in the compressive phases of the cycle. (However, compressive strength in fiberglass can be greatly increased with the addition of glass micro-spheres to the matrix as is done for lightweight racing sailboats.)

We can eliminate this oscillation if the impulse terminates when both the slope and the amplitude of the stress curve are zero. This condition occurs at times equal to an integral number of periods during a constant step-function load.

Because the electric potential of the load must be actively varied in order to draw energy from the field and because the liquid lithium stopping time is on the order of two to ten milliseconds, it appears possible to actively vary the load impedance in such a way that a tuned match can be made for each shot. Alternatively, we can choose the value of $\beta_k$ that will give a tuned match (this occurs for Sunburst for $\beta_k$ between one and two). If we do so, the fibers will be stressed only once each cycle, and will be stressed only in tension—this leads to greatly increased chamber-wall fatigue lifetimes, and is a further advantage unique to this invention.

The allowable chamber wall stress is responsible for limiting the maximum yield of a compact blanket reactor. In the short pulse limit, for an arbitrary maximum wall thickness of 20 cm we have a maximum yield of 661 MJ for $\beta_k=1$ and 332 MJ for $\beta_k=2$. In the long pulse limit for a 20 cm maximum wall thickness, the maximum yield is 1207 MJ and 547 MJ, respectively.

For Sunburst, at $\beta_k=1$, the maximum yield is 3621 MJ. If the maximum safe stress (with a safety factor of two) is 2 or 3 times as high as we have used, or if manufacturing techniques permit wall thickness 2 or 3 times as high as we have used, then the maximum yield is 2 or 3 times as high as 3621 MJ. This confirms one of the four major advantages of the compact blanket reactor system—it offers one of the only possibilities of a truly high-yield ICF reactor designs. It also demonstrates the great advantage of the magnetic "cushioning" used in this invention.

To demonstrate the great advantage of compact blankets on neutron-induced radioactivity in fusion reactor first walls we calculate the induced radioactivity in the same wall material (steel) as for magnetic fusion reactors and dry-wall ICF reactors, for compact blankets of one, two, and three meters in radius. Although steel will probably not be used as the first wall material of compact blanket reactors, this will allow us to understand now compact blankets affect total radioactivity in a general way without constraint to any particular set of construction materials. (The radioactivity using our candidate construction materials with Starburst and Sunburst later will also be estimated.)

Figure 16:
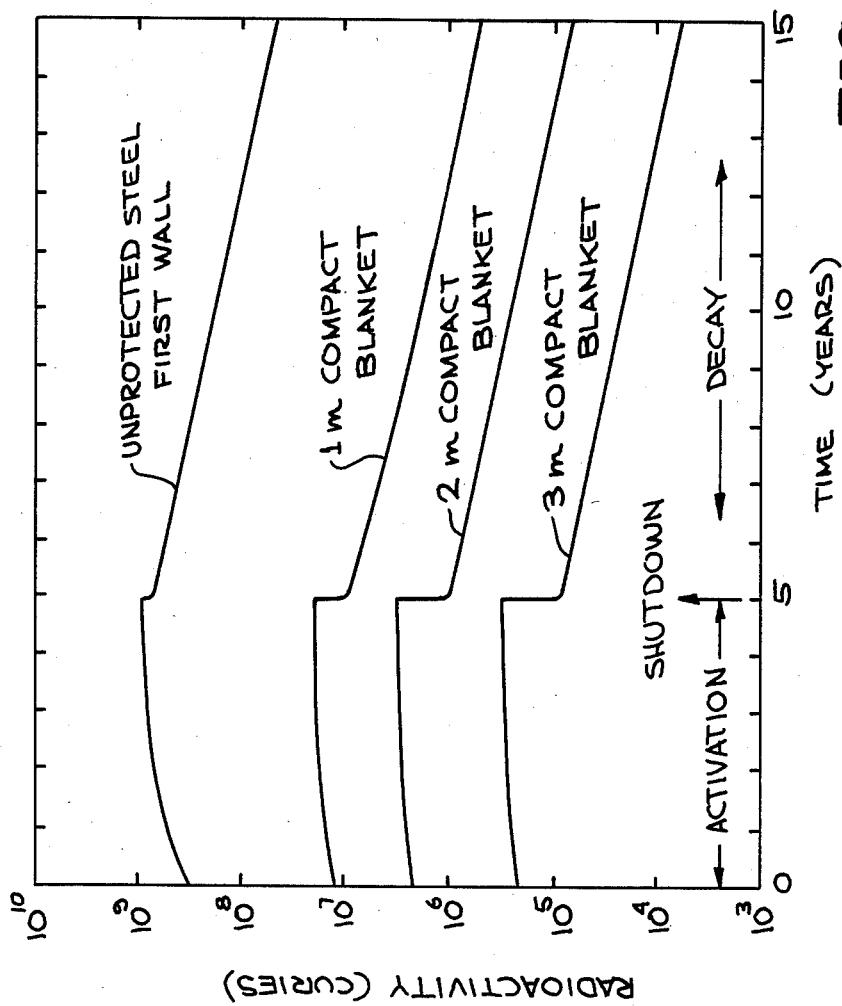
FIG. 16 is a plot of total induced radioactivity at the first wall for an unprotected wall and for 1, 2 and 3 m compact blankets.

The results of a numerical calculation for a five- year period of activation, and for a ten-year decay period, are given in FIG. 16 (per centimeter of first wall thickness, at 2700 MW-fusion power, using steel for a fair comparison to other fusion reactors). It is not necessary to simulate activation much beyond five years because the principal activity is approximately in secular equilibrium. Note that in FIG. 16, a logarythmic ordinate spanning a factor of 10,000,000 is necessary to show the radioactive differences caused by the use of compact blankets. Because the same first wall material, first wall thickness, and fusion power was used for each case, the effect shown in FIG. 16 is due only to the presence of the compact blankets, and not due to any special geometry or low-activating materials choice.

Because the neutron flux for our candidate wall materials is the same as for the calculations using steel first walls, and because (for two-member activation sequences) the radioactivity of each nuclide is directly proportional to the activation rate whether or not secular equilibrium has been achieved, the radioactivity at shutdown is nearly the same for both kinds of first walls. However, because of the much shorter half-lives of the principal radionuclides in the case of the yttria-aluminum-glass walls, the total radioactivity after shutdown falls off much more quickly. This is important for accident safety, because there is a period on the order of several minutes to hours before an accidental catastrophic release of radioactive material can be atmospherically transported to the public. In addition, the rapid decay of induced radioactivity has obvious advantages for waste disposal and maintenance.

Figure 17:
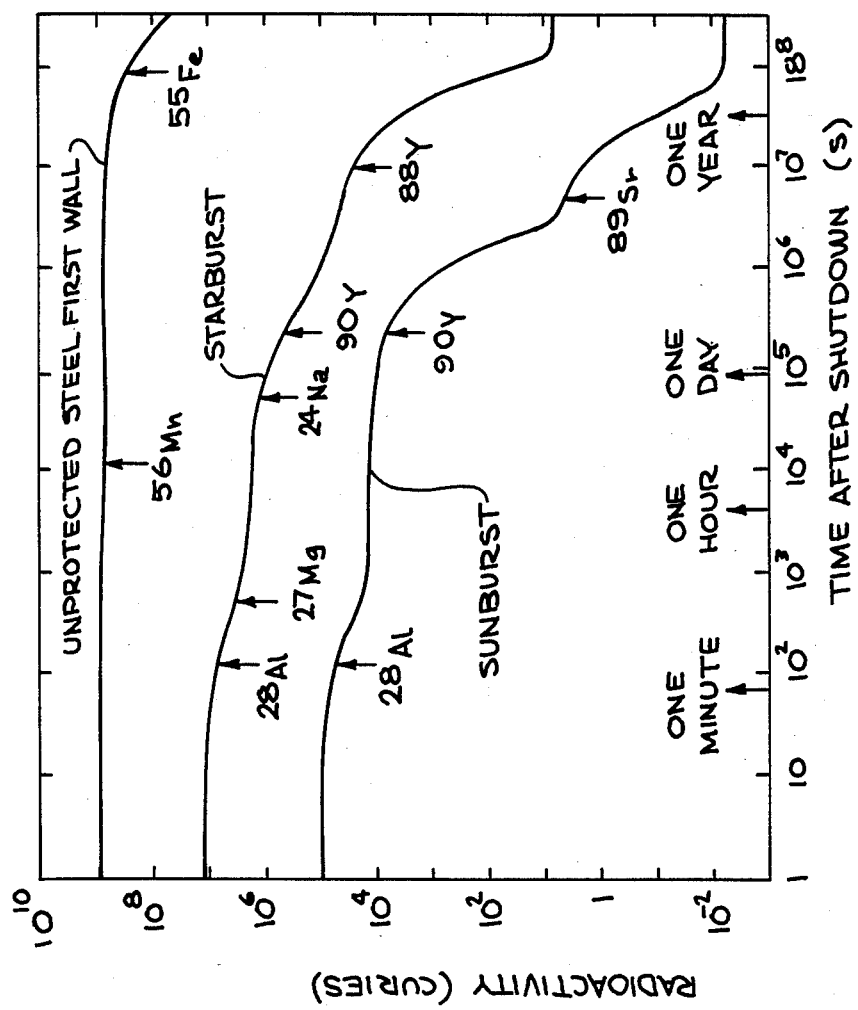
FIG. 17 compares the decay activity of compact blanket reactor chamber walls to a unprotected steel first wall.

For yttria-aluminum-glass walls after a five-year irradiation time, the total radioactivity of the shut- down is given in FIG. 17, on a basis normalized per centimeter of first wall thickness per 2700 GW of fusion power. The total radioactivity are is nearly constant after the first hour of operation (when $28^{Al}$, with a 2.24-minute half-life, has reached secular equilibrium).

A logarythmic abscissa is necessary because otherwise the decay of the Y-Al-Si$_2$O all is a featureless sharp descending straight line on the scale of ten years shown. Note that in order to compare the total residual radioactivities at the end of ten years' decay the ordinate spans a factor of 10,000,000,000,000!

(The results for the Y-Al-Si$_2$O wall must be taken with an understanding that the calculations assumed pure materials. It is possible that minor impurities which have not been accounted for will dominate the radioactivity of our chamber wall at late decay times.)

It appears that if alumina or beryllia were used instead of yttria, radioactivities after a period of a few days might fall to such low levels that hands-on maintenance might be possible.

With molten-salt separation techniques, the content of tritium in liquid lithium can be kept to about one weight ppm. If we assume that there is ten times the volume of lithium in the recirculation and heat exchange system as the volume of lithium in each compact blanket, then we have for Starburst, a tritium inventory of 0.0209 kg, and for Sunburst, 0.565 kg (compared to the typical 10 kg of tritium of other fusion reactor designs, such as STARFIRE). This low inventory is of great advantage for three reasons: (1) The hazard potential of a tritium release is proportionately less (by a factor of 17 to 478); (2) the expense for the amount of tritium needed for startup is proportionately less; and (3) together with exceptionally-high breeding ratios, the time required to produce enough tritium to start up other compact blanket reactors is much less.

This corresponds to 5.30 MCi of tritium for Sunburst and 196 kCi for Starburst (compared to 93.8 MCi of tritium for typical fusion reactors naving a 10-kg tritium inventory.)

Of the six constraint lines in yield-radius operating parameter space only two remain to be defined. They are the constraint lines for the maximum reasonable chamber size, and the maximum fraction of plant power for lithium recirculation.

We will choose a maximum reasonable chamber radius of about five meters. Although this is not a well-defined limit, sizes much beyond this are bound to be economically unattractive because of their construction and maintenance costs. Therefore, for $\beta_k=1$ the maximum lithium sphere radius is 3.29 m; and for $\beta_k=2$, it is 3.91 m.

Figure 18A:
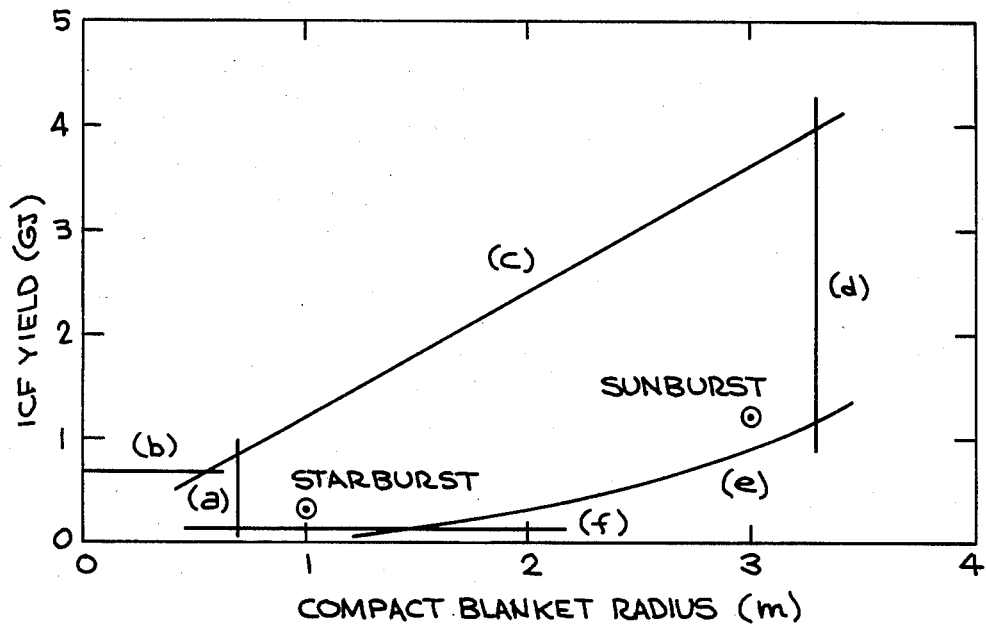
FIGS. 18 A and B show the operating parameter space at $\beta_k=1$ and $\beta_k=2$, respectively.

Further assume that about 5% of gross fusion power is a maximum that can be afforded for a major plant system. (Although this is a typical maximum for utility power plants, in our case we may be able to afford more than 5% because of the high efficiency of the kinetic conversion cycle.) Equating the energy required to lift the mass of a compact blanket to a typical lift height to 5% of the yield with a size-, mass-, and efficiency-optimized electromagnetic pump efficiency of 50.2%, and a pump lift height of 20 m, we arrive at the curves (e) shown in FIGS. 18(a) and (b), together with the other constraints for the $\beta_k=1$ case and the $\beta_k=2$ case, respectively. In addition, the operating points for Starburst and Sunburst are shown on each figure.

Figure 19:
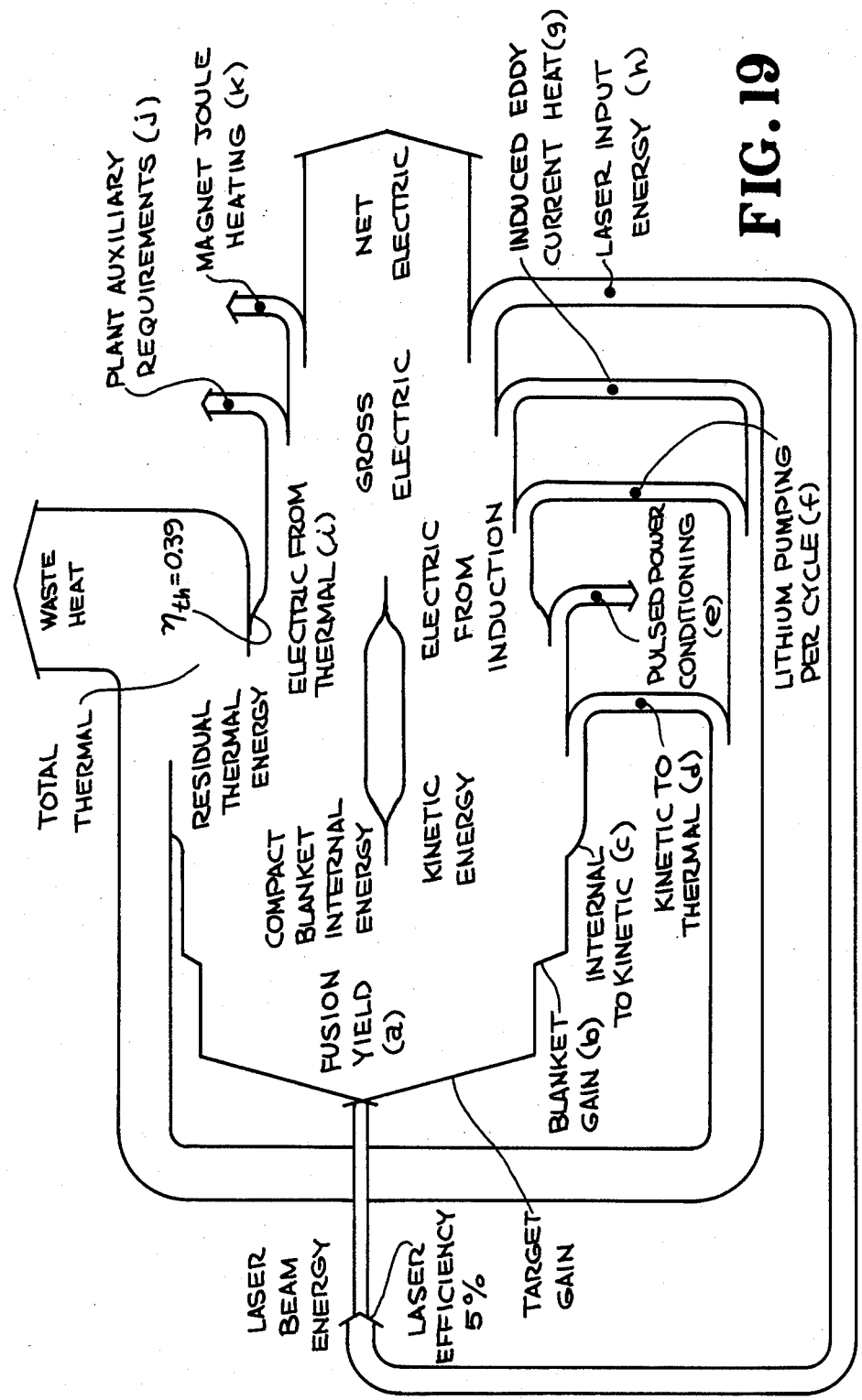
FIG. 19 shows the energy flow in the compact blanket reactor

An energy flow diagram (drawn approximately to scale for the Sunburst reactor at the $\beta_k=1$ operating point) is shown as FIG. 19. The internal energy of the blanket is divided between kinetic energy of the compact blanket after shock and relief (the lower branch) and residual thermal energy (the upper branch).

Figure 18B:
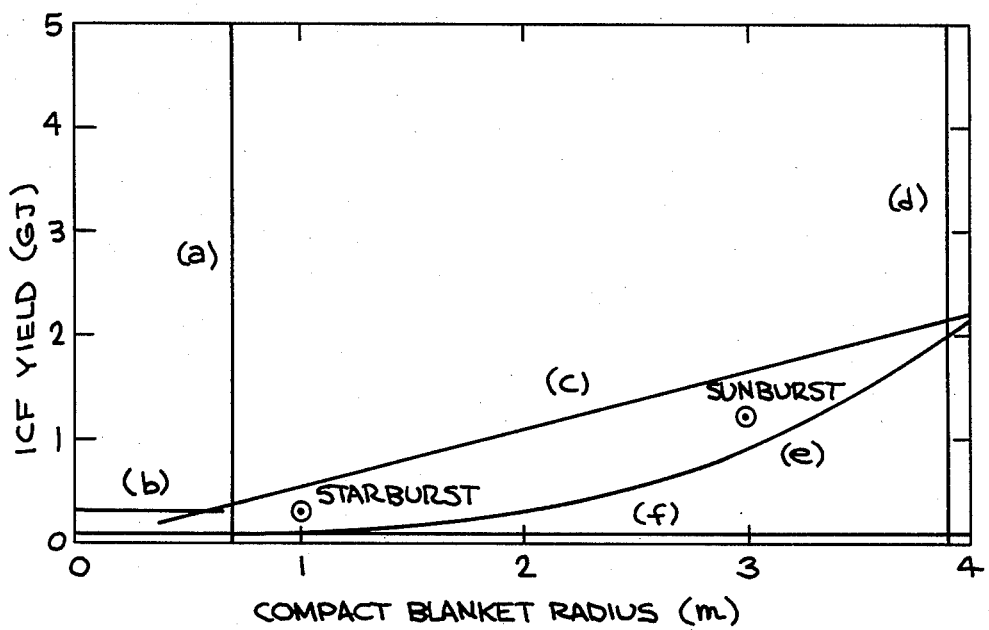

The net electric efficiency is estimated with the energy cycle of FIG. 18 as follows:

(a) begin with the chosen fusion yield of 300 MJ for Starburst and 1200 MJ for Sunburst.

(b) multiply by the blanket energy multiplication factor of 1.009 for Starburst and 1.165 for Sunburst to account for the change in total energy due to nuclear reactions in the compact blanket (as shown in FIG. 5).

(c) divide the blanket internal energy into kinetic energy of the liquid lithium and into residual thermal energy after shock and relief. The fraction of internal-to-kinetic energy is 13.7% for Starburst and 41.6% for Sunburst.

(d) subtract ten percent of the kinetic energy of the lithium and add it to the residual thermal energy to account for lithium kinetic energy that is converted to heat through splashing or that escapes the axial magnetic ends and is converted to heat through a short-circuited MHD generator.

(e) subtract seven percent of the remaining kinetic energy for power conditioning losses (this is consistent with current utility power conditioning technology) as it is converted to usable electric energy.

(f) subtract from the electric energy 0.821 MJ for Starburst and 22.2 MJ for Sunburst for the energy required to lift a compact blanket 20 m with a pump efficiency of 50.2%. In electromagnetic pumping, this energy is principally manifested as heat in the liquid lithium, and we will therefore add it to the residual thermal energy.

(g) subtract from the electric energy and add to the residual thermal energy 11.0 MJ (15.1 MJ for a $\beta_k$ of two) for Starburst and 93.6 MJ (127 MJ for a $\beta_k$ of two) for Sunburst to account for the induced eddy current resistive heating of the lithium by the magnet system.

(h) subtract from the electric energy 40 MJ for Starburst and 80 MJ for Sunburst for the laser energy required to produce the respective fusion yields of 300 MJ and 1200 MJ with a laser efficiency of 5% and an assumed gain of 150 for Starburst and of 300 for Sunburst (these gains are averaged between current conservative and optimistic gain estimates for their respective driver energies).

(i) add to the electric energy an amount equal to the total thermal energy multiplied by the thermal conversion efficiency of 39%. This is the same thermal conversion efficiency as is currently proposed for the HYLIFE reactor design because we have assumed the same high lithium temperature of 773 K. (However, with the highly-efficient kinetic conversion branch of compact blanket reactors, it may be desirable to operate at considerably low temperatures and accept a lower thermal conversion efficiency.)

(j) subtract from the electric energy an amount equal to 3% of the gross thermal energy to account for plant auxiliary requirements (this is the same as assumed for HYLIFE and is typical of present-day power plants).

(k) subtract from the electric energy an amount equal to 0.0708 of the eddy current heat in the lithium to account for the unrecoverable resistive heat lost in the magnets.

Defining the net electric efficiency as the ratio of the net electric energy to the compact blanket internal energy, the net electric efficiency is 45.8% and 27.1% for Sunburst and Starburst at $\beta_k = 1$; and 44.1% and 26.1%, respectively, at $\beta_k = 2$.

For comparison, an effective "conversion efficiency" equals the ratio of the gross electric energy to the blanket internal energy. This yields 55.2% and 43.3% for Sunburst and Starburst at $\beta_k = 1$; and 53.6% and 42.3% at $\beta_k = 2$.

The selection of an operating point depends on the economic benefit received from several considerations characteristic of different regions in operating parameter space.

There are two effects which increase net electric efficiency. At higher yields, target gains are higher, and therefore a lower fraction of electric energy is required for recirculation. Also, with the compact blankets of larger radii, more of the fusion yield is converted to kinetic energy, which can then be converted to electricity with a higher efficiency than is the case for residual thermal energy.

The larger the compact blanket radius, the lower the neutron-induced radioactivity in the surrounding environment (each meter reduces this activity by a little more than one order of magnitude). As with no other reactor system, the possibility exists of hands-on maintenance, if necessary, with compact blankets of the Sunburst size. However, if blanket radii become too large, the mechanical equipment required to form them may become too expensive and the pumping power and pump equipment costs may also become prohibitive.

The pulsed power storage requirement varies roughly with three times the initial kinetic energy of the lithium. Since the lithium kinetic energy increases with both the yield and with the blanket radius, pulsed power storage becomes more expensive in this region of parameter space. However, at smaller radii, the times required for energy transfer become smaller, and this can raise the cost of energy storage considerably. As one further consideration, we have seen that because of the large inductance of the larger compact-blanket-chamber-magnet systems, considerably higher voltages must be provided to achieve the required magnetic field rise times, with greater expense for the same storage requirements.

To some extent, the cost of a power plant is proportional to the physical size of its components. In this respect the Starburst compact blanket reactors have a great advantage in being the only ICF reactor system which can contain the fusion yield in a chamber of less than two meters in radius. However, because of the low maximum yield at blanket radii of one meter, and because of the apparent low repetition rate for each reaction chamber, there will have to be several chambers in operation if the plant is to provide on the order of 1000 GW-electric. The Starburst reactors offer the possibility of small-power (a few hundred megawatt) local power plants if laser energy is brought in "pipelines" from a central laser that serves several plants so that the total plant cost is reasonable.

Because of the high efficiency of the larger-radius compact blanket reactors, it may be desirable to operate at lower lithium temperatures. Although this would reduce the thermal conversion efficiency, it would also reduce the corrosive effects of the liquid lithium and the plant maintenance and equipment costs. The higher conductivity of liquid lithium at lower temperatures would lead to increased electromagnetic pump efficiency and to decreased magnetic diffusion in the compact blankets. A proper choice of temperature requires a detailed balance-of-plant study and also considers the ductile-to-brittle transition of materials.

It is clear that we would like to operate with a compact blanket radius as large as possible. As we have seen, we can gain greatly in both net electric efficiency and in reduced radioactivity. The radius of the compact blanket should be chosen as large as possible consistent with cost constraints from increased chamber size, pulsed power storage requirements, and pump and mechanical equipment costs.

The choice of kinetic beta has little effect on pulsed power storage requirements or on net electric efficiency. Its choice will be determined only after the sphere smoothnesses are known by balancing two effects: the higher the beta, the greater the wall stresses; the lower the beta, the larger the physical size of the chamber.

Finally, we would like to operate at the largest yield possible. This accomodates lower efficiency, low repetition-rate lasers and less-than-expected target gains; allows more expensive target fabrication costs; and provides much more time for clearing the reaction chamber of debris and plasma between shots.

The characteristics of Starburst and Sunburst at a kinetic beta of one and of two are summarized in the table below for comparison:

|  | Starburst | Sunburst |
|---|---|---|
| Yield | 300 MJ | 1200 MJ |
| Initial kinetic energy | 41.0 MJ | 492 MJ |
| Magnetic field energy | 41.0–81.9 MJ | 492–984 MJ |
| Initial lithium sphere radius | 1.0 m | 3.0 m |
| Initial lithium velocity after shock and relief | 198 m/s | 132 m/s |
| Initial lithium kinetic energy density | 9.78 MJ/m$^3$ | 4.35 MJ/m$^3$ |
| Maximum perturbation electric energy storage cost | 12.3 M$ | 148 M$ |
| 5-yr activity | 12.5 MCi | 96.0 kCi |
| Tritium activity | 196 kCi | 5.30 MCi |

We have concentrated on the flow of energy, rather than power, to obtain the net electric plant efficiency. Consequently, our results for efficiency are not affected by the repetition rate of the fusion yield.

|  | $\beta_k = 1$ | $\beta_k = 2$ | $\beta_k = 1$ | $\beta_k = 2$ |
|---|---|---|---|---|
| lithium stopping distance | 0.261 m | 0.145 m | 0.781 m | 0.434 m |
| lithium stopping time | 2.46 ms | 1.37 ms | 11.02 ms | 6.21 ms |
| magnet and induced eddy current | 7.89 MA | 11.2 MA | 15.8 MA | 22.3 MA |
| magnetic diffusion depth | 2.80 cm | 2.09 cm | 5.92 cm | 4.45 cm |
| system inductance | 2.58 μh | 1.31 μh | 7.76 μh | 3.93 μh |
| chamber wall radius | 1.52 m | 1.29 m | 4.56 m | 3.88 m |
| field rise time voltage | 82.7 kV | 107 kV | 111 kV | 141 kV |
| resistive heating | 11.0 MJ | 15.1 MJ | 93.6 MJ | 127 MJ |
| magnetic field strength | 4.96 T | 7.01 T | 3.31 T | 4.68 T |
| maximum initial perturbation amplitude | 6.3 cm | 14.2 cm | 19.0 cm | 42.6 cm |
| initial load voltage | 6.17 kV | 8.75 kV | 8.23 kV | 11.6 kV |
| final lithium shell thickness | 0.261 m | 0.645 m | 0.781 m | 1.93 m |
| chamber wall mechanical period | 3.04 ms | 2.58 ms | 9.13 ms | 7.80 ms |
| safe thickness for fiberglass wall | 5.00 cm | 10.6 cm | 6.65 cm | 13.9 cm |
| fiberglass wall mass | 2.74 Mg | 4.19 Mg | 32.7 Mg | 49.7 Mg |
| fiberglass wall estimated cost | 30.2 k$ | 46.1 k$ | 360 k$ | 547 k$ |

The net electric power of the plant will equal the net electric energy per cycle times the repetition rate. It will therefore be to greatest commercial advantage to operate at the highest repetition rate consistent with electrical demand in order to gain the most return on capital.

If the compact blankets are dropped in free fall a distance of the order of five meters the repetition rate for each chamber will be limited to about one hertz. However, especially for the smaller and cheaper compact blanket chambers, it seems feasible to operate several chambers at once at each plant, thereby raising the total repetition rate at each plant and increasing the return on the capital investment in the laser or beam driver. This raises the attractive possibility of performing on-line maintenance—the plant continues operation with some of the reaction chambers while others are being maintained.

On the other hand, high repetition rates at the same plant may be unacceptable if target gains are not as large as currently hoped for: to achieve economic gain-efficiency products, a plant of typical electric power may require high yield and low repetition rate. This is because the yield from an ICF target increases much more than at a linear rate as the laser or beam energy is increased. Alternatively, if the lasers or beam drivers cannot be made sufficiently efficient, then a high yield must be used to produce electric power economically. Compact blanket reactors offer one of the only ICF systems capable of handling high yields.

In addition to the preferred embodiments of the invention described above, alternate embodiments may be implemented.

Superconducting magnets may be utilized although they cannot easily be pulsed on millisecond time scales. If superconducting magnets are run in steady state, eddy current heating from magnetic field diffusion into the lithium would cause a substantial load loss as the compact blanket enters the chamber, and the Lorentz forces on the surface of the liquid sphere would deform it as it enters the chamber, enhancing fluid instability. In either case, small movements from impulsive loading can induce eddy currents in super-conductors which cause local heating and quenching. Superconductors must be surrounded with thick thermal insulators—a space and design constraint. Because of the cryogenic temperatures, energy equal to many times the heat removed must be expended for refrigeration—an inefficient and possibly expensive power requirement. Superconductors may be useful, however, if external MHD generators are used, since many of these constraints are relaxed for applications outside the chamber.

Alternatively baseball and yin-yang magnets may be utilized because of their minimum-B stable confinement properties; however, the liquid lithium would carry the field lines with it and possibly reverse the curvature, destroying stability. Furthermore, in order to provide for entry of the compact blankets, minimum-B magnets would be so large that substantially more energy would have to be stored in their magnetic fields than with other alternatives. Non-superconducting, large minimum-B magnets would have high ohmic power losses and large pulsed power handling requirements.

Thus, minimum-B configurations are not absolutely necessary to control instability. Although fluid instability is catastropic in a steady-state system (such as magnetically-confined fusion), instabilities are not dangerous in a pulsed system (such as inertially-confined fusion) if their growth times are long compared to critical fluid times. Therefore, if fluid instability remains a problem, minimum-B magnets may be useful.

An azimuthally-continuous conducting reaction chamber surface could serve as the magnet itself. This has the advantage that, with the current carried as uniformly as possible over the entire surface, the expansive Lorentz forces would be applied evenly, as if there were a gas pressure contained within.

There must be two holes at the axial ends of the surface to permit the magnetic flux to enter and exit the chamber (as is required by Ampere's law; flux lines must completely enclose current-carrying elements). Other holes for entry and exit of the compact blankets in this surface—except at its two ends—would cause inhomogeneities in the field that can only be roughly compensated with external field shaping coils. Kinetic liquid lithium would find its way into these weak spots and, unless stopped in time, would be accelerated out of the confinement space once past the point of maximum field strength. Furthermore, the use of field shaping coils would lead to much more total pulsed magnetic field energy than in schemes where the flux is confined inside the chamber.

However, it may be possible to create a suitably homogeneous field with a set of Helmholtz pairs, after considering the effect of the perturbation to the field by the presence of the lithium sphere in its center. The simplicity offered by this configuration, which would require no moving parts to allow for entry of the compact blankets and still permit a horizontal laser-beam optics system, could very easily more than compensate for whatever disadvantage arises from the greater field energy that may be required and then more concentrated force loading that would result. Thus, this embodiment may be a viable alternative to the configurations which involve moving parts.

Both the fluid instabilities and the pulsed energy stored in the magnetic field are minimized if a homogeneous magnetic field surrounds the compact blanket, providing the most uniform jxB surface pressure possible, and requiring the least total magnetic field energy. The jxB surface pressure cannot be uniform over the entire sphere, since there must be two points at which the magnetic field has no component perpendicular to the lithium surface. A magnetic field which is approximately homogeneous and parallel to most of the lithium surface can be generated by using a continuous current-carrying surface having a non-spherical shape.

The surface shape is determined in the following way: By Gauss' Law, the magnetic field lines must be continuous and have no sources or sinks, so the number of lines is conserved along the axis. On short time scales, the lines can penetrate neither the conducting walls nor the lithium, and are therefore confined to the intervening space. Therefore, to achieve a uniform field strength (i.e., a uniform density of field lines), requires a constant area on truncated conical sections between the lithium and the conducting surface with the apexes at the sphere center.

As another consideration, corrections must be made for the finite conductivity of both the lithium and the conductors which have the effect of allowing the lines to diffuse to some time-dependent depth. Also, it may be desirable to shape the magnetic field so that the field strength is either greater or weaker at the throats of the chamber in order to minimize or maximize the portion of energy converted by MHD generation.

Because the field lines must curve away from a spherical compact blanket surface at its axial ends, more of the lithium surface will be parallel to the field if the compact blanket is elongated, like a football. This shape will not enhance fluid instabilities since the flutes develop parallel to the field lines. For stability, the compact blanket need only be azimuthally symmetric. However, since the lithium is in the liquid state for good thermal-to-electric efficiency, and since a sphere is the shape of least surface tension energy, spherical compact blankets are preferred. Oblong shapes might nevertheless be achievable by quickly freezing a thin layer of the lithium surface before the compact blanket is released.

The chamber radius must be about 3/2 the compact blanket radius in order to minimize the stored magnetic field energy and to allow for instability growth during deceleration of the lithium. Therefore, the optimum chamber size is not much greater than the size of the compact blanket itself.

Since the beams enter the lithium sphere at two opposite points, it seems natural that the axis of the beam tube be aligned with the axis of the magnetic field. Moreover, this alignment provides a way to guide escaping gases out of the chamber and will not intefere if charged-particle beams are used.

The magnets may be configured in several ways in order to capture a freely-falling compact blanket in an azimuthally-continuous chamber of such small radius. The conducting surface can be composed of a combination of externally-driven conductors and of azimuthally-continuous conducting surfaces, or "flux restrainers". For short times compared to the time of magnetic diffusion through the walls of the flux restrainers, eddy currents will be established which will prevent the escape of flux lines through them.

If the chamber axis of symmetry is vertical, the compact blanket could drop into a chamber with no moving parts, but it is more difficult to arrange the beam optics. If the chamber axis of symmetry is horizontal, moving parts are required to capture the freely-falling sphere. Cyclic motion of conducting sections can be accomplished with either translation or rotation. For both types, the direction of motion may be either parallel to the axis of symmetry or transverse to it.

For translating sections moving transverse to the symmetry axis, and for rotating sections with an axis of rotation parallel to the symmetry axis, azimuthal current continuity requires brushes for electrical contact. Although brushes are feasible if velocities are not high, they are an unnecessary and undesirable feature. Accordingly, there are two preferred configurations: (1) an azimuthally-continuous monolithic chamber section translating horizontally and parallel to the field axis, and (2) the same chamber section rotating about a horizontal axis that is transverse to the field axis.

If the sections translate, they would require some provision for periodically storing their kinetic energy in potential energy form, as is done in oil well pumps. This kinetic energy could be substantial, since the chamber sections must be large enough to allow for entry of the compact blankets, and they must move fast enough that they can cover the entry space before the compact blanket is at the chamber center. Rotating sections, however, provide the possibility of constant motion so that no potential energy storage is needed.

The invention is further described in UCRL-53434, "The Feasibility of a Laser or Charged-Particle Beam Fusion Reactor Concept with Direct Electric Generation by Magnetic Flux Compression", by George P. Lasche, Lawrence Livermore National Laboratory, 1983, which is herein incorporated by reference.

Changes and modifications in the specifically described embodiments can be carried out without departing from the scope of the invention which is intended to be limited only by the scope of the appended claims.

I claim:

1. A method for recovering energy in an inertial confinement fusion reactor having a reactor chamber and a sphere forming means positioned above an opening in said reactor chamber, comprising:

embedding a fusion target fuel capsule having a predetermined yield in the center of a hollow solid lithium tube and subsequently embedding said hollow solid lithium tube in a liquid lithium medium;

using said sphere forming means for forming said liquid lithium into a spherical shaped liquid lithium mass having a diameter smaller than the length of said hollow solid lithium tube with said hollow solid lithium tube being positioned along a diameter of said spherical shaped mass, wherein said step of forming said spherical shaped mass includes the step of determining the size of said diameter in relation to said predetermined yield such that said spherical shaped liquid lithium mass is large enough to absorb substantially all of the fusion energy produced by the imploding fusion fuel target capsule with said liquid lithium being maintained in a liquid state;

providing said spherical shaped liquid lithium mass with said fusion fuel target capsule and hollow solid lithium tube therein as a freestanding liquid lithium shaped spherical shaped mass without any external means for maintaining said spherical shape by dropping said liquid lithium spherical shaped mass from said sphere forming means into said reactor chamber;

producing a magnetic field in the reactor chamber;

imploding the target capsule in the reactor chamber to produce fusion energy;

absorbing fusion energy in said liquid lithium spherical shaped mass to convert substantially all the fusion energy to shock induced kinetic energy of said liquid lithium spherical shaped mass which expands said liquid lithium sperical shaped mass; and compressing the magnetic field by expansion of said liquid lithium spherical shaped mass and recovering useful energy.

2. The method of claim 1 further comprising applying the magnetic field just before the target is imploded.

3. The method of claim 1 further comprising producing the magnetic field of a magnitude to stop the expansion of the medium before reaching the walls of the chamber.

4. The method of claim 1 wherein the step of imploding the target capsule is performed by directing a fusion driver beam into the chamber and into the hollow solid lithium tube to implode the fusion target capsule.

5. The method of claim 4 further comprising forming the driver beam of a laser beam.

6. The method of claim 4 further comprising forming the driver beam of a charged particle beam.

7. The method of claim 1 further comprising forming the spherical shaped liquid lithium mass of about 1–3 m in radius.

8. The method of claim 1 further comprising forming the laser fusion target capsule of about 300–1200 MJ yield.

9. The method of claim 1 further comprising forming a shell of frozen lithium surrounding the spherical shaped liquid lithium mass and melting the frozen shell prior to imploding the fuel capsule.

10. The method of claim 1 further comprising forming the spherical shaped liquid lithium mass with dimensions about ⅝ to ¾ the dimensions of the reactor chamber.

* * * * *